(12) United States Patent
Tang

(10) Patent No.: US 10,165,205 B2
(45) Date of Patent: Dec. 25, 2018

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Dongguan (CN)

(72) Inventor: Cheng Tang, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/783,203

(22) Filed: Oct. 13, 2017

(65) Prior Publication Data
US 2018/0152648 A1    May 31, 2018

(30) Foreign Application Priority Data
Nov. 29, 2016  (CN) .......................... 2016 1 1079637

(51) Int. Cl.
*H04N 5/347*   (2011.01)
*H04N 5/232*   (2006.01)
(Continued)

(52) U.S. Cl.
CPC ......... *H04N 5/349* (2013.01); *H04N 5/23212* (2013.01); *H04N 5/347* (2013.01);
(Continued)

(58) Field of Classification Search
CPC .... H04N 5/349; H04N 9/045; H04N 5/23212; H04N 9/77; H04N 7/0135; H04N 5/347; H04N 5/359; G06T 5/00
See application file for complete search history.

(56) References Cited

U.S. PATENT DOCUMENTS

| 6,829,008 B1 | 12/2004 | Kondo et al. |
| 2006/0098970 A1 | 5/2006 | Sato |

(Continued)

FOREIGN PATENT DOCUMENTS

| CN | 104280803 A | 1/2015 |
| CN | 105120248 A | 12/2015 |

(Continued)

OTHER PUBLICATIONS

PCT/CN2017/087556 International Search Report and Written Opinion dated Jul. 27, 2017, 12 pages.
(Continued)

*Primary Examiner* — Hung H Lam
(74) *Attorney, Agent, or Firm* — Lathrop Gage LLP

(57) ABSTRACT

An image processing method is provided. The image sensor is controlled to output the merged image. The depth-of-field area is identified based on the merged image. The image sensor is controlled to output the color-block image. A first part of the color-block image within the depth-of-field area is converted into a first simulation image using a first interpolation algorithm. The second part of the color-block image outside the depth-of-field area is converted into a second simulation image using a second interpolation algorithm. The first simulation image and the second simulation image are merged to generate a simulation image corresponding to the color-block image.

22 Claims, 20 Drawing Sheets

(51) Int. Cl.
*H04N 5/349* (2011.01)
*H04N 7/01* (2006.01)
*H04N 9/77* (2006.01)
*H04N 9/04* (2006.01)
*G06T 5/00* (2006.01)
*H04N 5/359* (2011.01)

(52) U.S. Cl.
CPC ........... *H04N 7/0135* (2013.01); *H04N 9/045* (2013.01); *H04N 9/77* (2013.01); *G06T 5/00* (2013.01); *H04N 5/359* (2013.01)

(56) References Cited

U.S. PATENT DOCUMENTS

| | | | |
|---|---|---|---|
| 2009/0200451 A1 | 8/2009 | Conners | |
| 2012/0301044 A1* | 11/2012 | Nakada | H04N 5/2258 382/255 |
| 2013/0202191 A1* | 8/2013 | Wang | H04N 13/261 382/154 |
| 2014/0267701 A1* | 9/2014 | Aviv | G01C 11/025 348/136 |
| 2015/0009383 A1 | 1/2015 | Fujii et al. | |
| 2015/0181124 A1* | 6/2015 | S V | H04N 5/23258 348/46 |
| 2015/0332099 A1* | 11/2015 | Kosubek | B60S 1/0844 348/148 |
| 2016/0037060 A1 | 2/2016 | Lim et al. | |

FOREIGN PATENT DOCUMENTS

| | | |
|---|---|---|
| CN | 105592303 A | 5/2016 |
| CN | 106454289 A | 2/2017 |
| CN | 106507069 A | 3/2017 |
| EP | 2753082 A1 | 7/2014 |

OTHER PUBLICATIONS

European Patent Application No. 17199860.2 extended Search and Opinion dated Apr. 20, 2018, 7 pages.

* cited by examiner

Merged image

| R | R | Gr | Gr |
|---|---|---|---|
| R | R | Gr | Gr |
| Gb | Gb | B | B |
| Gb | Gb | B | B | color-block image

Fig. 7

IMAGE PROCESSING METHOD AND APPARATUS, AND ELECTRONIC DEVICE

CROSS-REFERENCE TO RELATED APPLICATIONS

This application is based on and claims priority of Chinese Patent Application No. 201611079637.X, filed on Nov. 29, 2016, the entire contents of which are incorporated herein by reference.

FIELD

The present disclosure relates to the imaging technology field, and more particularly to an image processing method, an image processing apparatus and an electronic device.

BACKGROUND

When an image is processed using a conventional image processing method, either the obtained image has a low resolution, or it takes a long time and too much resource to obtain an image with high resolution, both of which are inconvenient for users.

DISCLOSURE

The present disclosure aims to solve at least one of existing problems in the related art to at least extent. Accordingly, the present disclosure provides an image processing method, an image processing apparatus and an electronic device.

Embodiments of the present disclosure provide an image processing method. The image processing method is applied in an electronic device. The electronic device includes an imaging apparatus including an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing method includes: controlling the image sensor to output a merged image, in which, the merged image includes an array of merged pixels, and the photosensitive pixels in a same photosensitive pixel unit are collectively output as one merged pixel; identifying a depth-of-field area based on the merged image; controlling the image sensor to output a color-block image, in which, the color-block image includes image pixel units arranged in a preset array, each image pixel unit includes a plurality of original pixels, each photosensitive pixel unit corresponds to one image pixel unit, and each photosensitive pixel corresponds to one original pixel; converting a first part of the color-block image into a first simulation image using a first interpolation algorithm, in which, the first part of the color-block image is within the depth-of-field area, the first simulation image includes first simulation pixels arranged in a preset array, and each photosensitive pixel corresponds to one first simulation pixel; converting a second part of the color-block image into a second simulation image using a second interpolation algorithm, in which, the second part of the color-block image is outside the depth-of-field area, the second simulation image includes second simulation pixels arranged in a preset array, each photosensitive pixel corresponds to one second simulation pixel, and the first interpolation algorithm is more complex than the second interpolation algorithm; and merging the first simulation image and the second simulation image to generate a simulation image corresponding to the color-block image.

Embodiments of the present disclosure further provide an image processing apparatus. The image processing apparatus is applied in an electronic device. The electronic device includes an imaging apparatus including an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing apparatus includes a non-transitory computer-readable medium including computer-readable instructions stored thereon, and an instruction execution system which is configured by the instructions to implement at least one of a first control module, a second control module, a first converting module, a second converting module and a merging module. The first control module is configured to control the image sensor to output a merged image, in which, the merged image includes an array of merged pixels, and the photosensitive pixels in a same photosensitive pixel unit are collectively output as one merged pixel. The identifying module is configured to identify a depth-of-field area based on the merged image. The second control module is configured to control the image sensor to output a color-block image, in which, the color-block image includes image pixel units arranged in a preset array, each image pixel unit includes a plurality of original pixels, each photosensitive pixel unit corresponds to one image pixel unit, and each photosensitive pixel corresponds to one original pixel. The first converting module is configured to convert a first part of the color-block image into a first simulation image using a first interpolation algorithm, in which, the first part of the color-block image is within the depth-of-field area, the first simulation image includes first simulation pixels arranged in a preset array, and each photosensitive pixel corresponds to one first simulation pixel. The second converting module is configured to convert a second part of the color-block image into a second simulation image using a second interpolation algorithm, in which, the second part of the color-block image is outside the depth-of-field area, the second simulation image includes second simulation pixels arranged in a preset array, each photosensitive pixel corresponds to one second simulation pixel, and the first interpolation algorithm is more complex than the second interpolation algorithm. The merging module is configured to merge the first simulation image and the second simulation image to generate a simulation image corresponding to the color-block image.

Embodiments of the present disclosure provide an electronic device. The electronic device includes a housing, a processor, a memory, a circuit board, a power supply circuit, and an imaging apparatus. The circuit board is enclosed by the housing. The processor and the memory are positioned on the circuit board. The power supply circuit is configured to provide power for respective circuits or components of the electronic device. The imaging apparatus includes an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The memory is configured to store executable program codes. The processor is configured to run a program corresponding to the executable program codes by reading the executable program codes stored in the memory, to perform the image processing method according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

FIG. 7 is a schematic diagram of a color-block image according to an embodiment of the present disclosure.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the related art, an image sensor includes an array of photosensitive pixel units and an array of filter units arranged on the array of photosensitive pixel unit. Each filter unit corresponds to and covers one photosensitive pixel unit, and each photosensitive pixel unit includes a plurality of photosensitive pixels. When working, the image sensor is controlled to output a merged image, which can be converted into a merged true-color image by an image processing method and saved. The merged image includes an array of merged pixels, and the photosensitive pixels in a same photosensitive pixel unit are collectively outputted as one merged pixel. Thus, a signal-to-noise ratio of the merge image is increased. However, a resolution of the merged image is reduced.

Certainly, the image sensor can be controlled to output a high pixel color-block image, which includes an array of original pixels, and each photosensitive pixel corresponds to one original pixel. However, since a plurality of original pixels corresponding to a same filter unit have the same color, the resolution of the color-block image still cannot be increased. Thus, the high pixel color-block image needs to be converted into a high pixel simulation image by an interpolation algorithm, in which the simulation image includes a Bayer array of simulation pixels. Then, the simulation image can be converted into a simulation true-color image by an image processing method and saved. The resolution of the true-color image may be improved by using the interpolation algorithm. However, the interpolation algorithm consumes resource and time, thereby taking a long time to capture pictures and making user experience poor. Furthermore, in some particular applications, the resolution of a part of the true-color image within a depth-of-field area is focused by a user.

Thus, embodiments of the present disclosure provide a novel image processing method.

Figure 1:
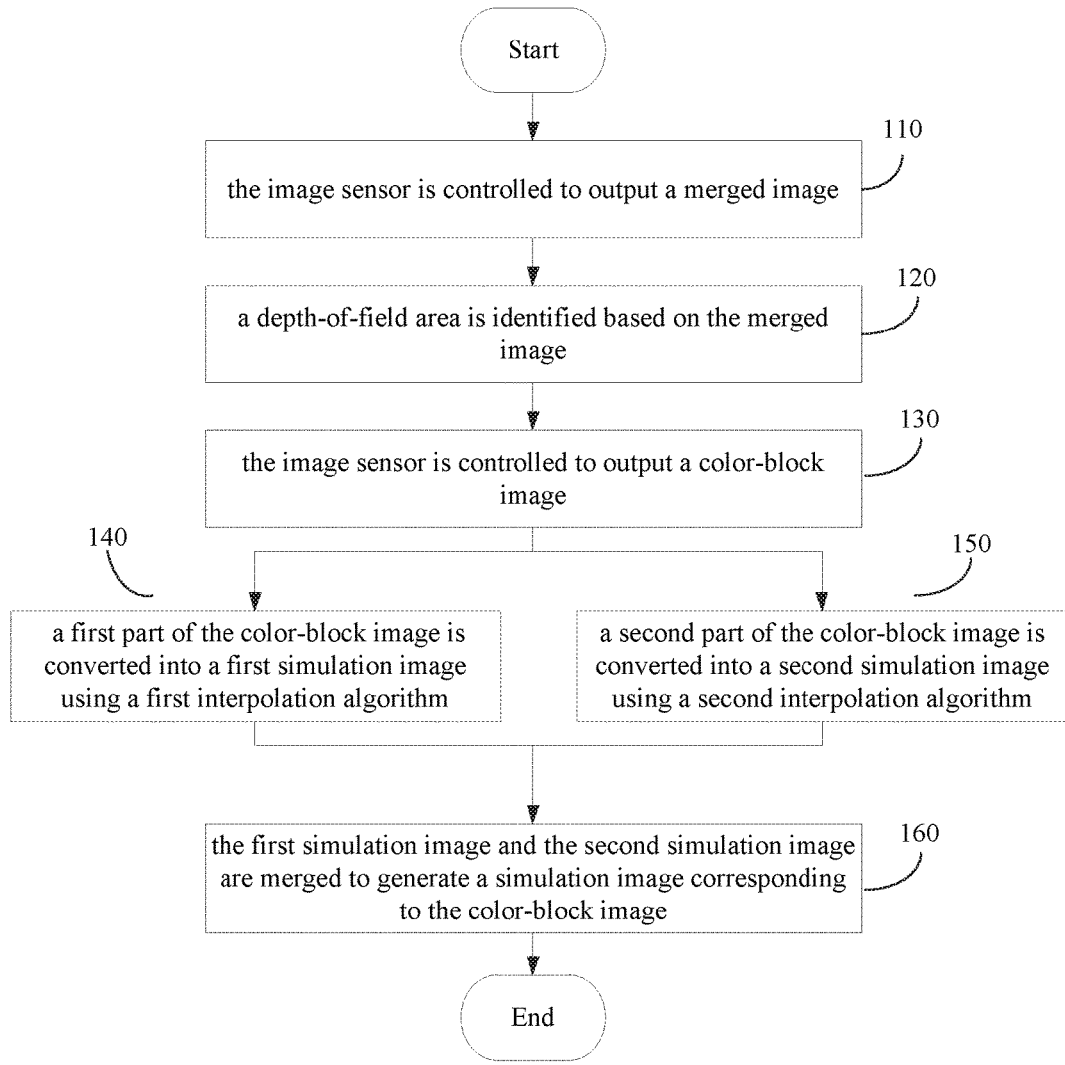
FIG. 1 is a flow chart of an image processing method according to an embodiment of the present disclosure.
Figure 2:
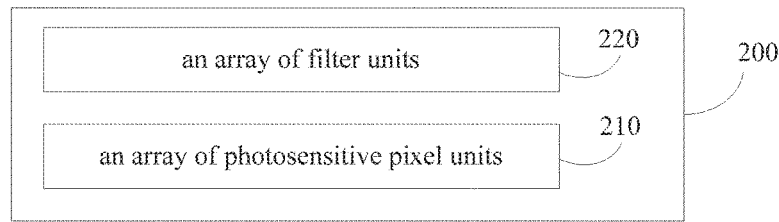
FIG. 2 is a block diagram of an image sensor according to an embodiment of the present disclosure.
Figure 3:
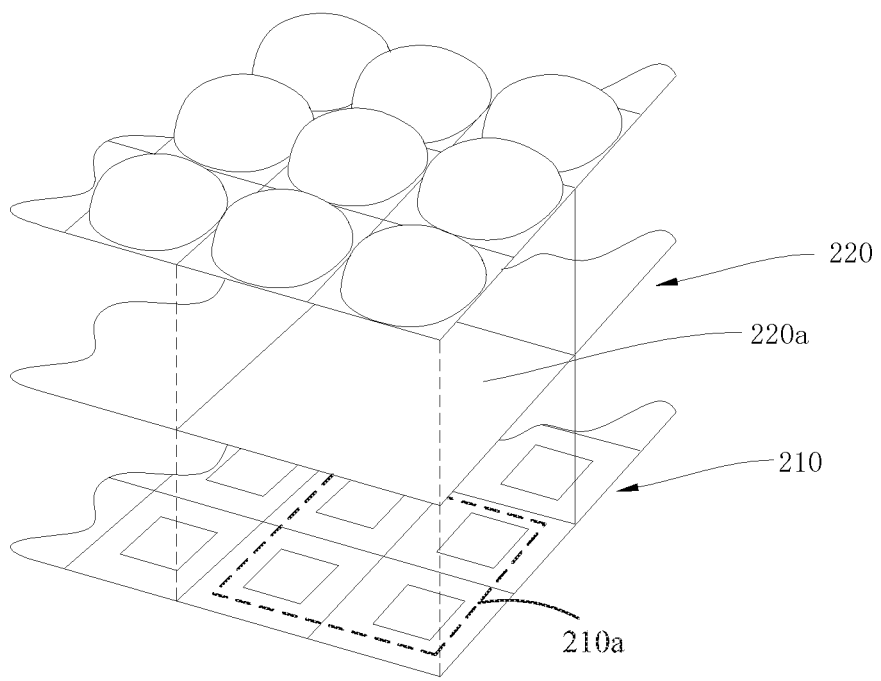
FIG. 3 is a schematic diagram of an image sensor according to an embodiment of the present disclosure.

Referring to FIG. 1, an image processing method is illustrated. The image processing method is applied in an electronic device. The electronic device includes an imaging apparatus including an image sensor. As illustrated in FIG. 2, the image sensor 200 includes an array 210 of photosensitive pixel units and an array 220 of filter units arranged on the array 210 of photosensitive pixel units. As illustrated in FIG. 3, the array 220 of filter units include a plurality of filter units 220a, and the array 210 of photosensitive pixel units includes a plurality of photosensitive pixel units 210a. Each filter unit 220a corresponds to and covers one photosensitive pixel unit 210a, and each photosensitive pixel unit 210a includes a plurality of photosensitive pixels 212 adjacent to each other. The image processing method includes the followings.

At block 110, the image sensor is controlled to output a merged image.

The merged image includes an array of merged pixels. The photosensitive pixels in a same photosensitive pixel unit are collectively output as one merged pixel.

At block 120, a depth-of-field area is identified based on the merged image.

At block 130, the image sensor is controlled to output a color-block image.

The color-block image includes image pixel units arranged in a preset array. Each image pixel unit includes a plurality of original pixels. Each photosensitive pixel unit 210a corresponds to one image pixel unit, and each photosensitive pixel corresponds to one original pixel.

At block 140, a first part of the color-block image is converted into a first simulation image using a first interpolation algorithm.

The first part of the color-block image is within the depth-of-field area. The first simulation image includes first simulation pixels arranged in a preset array, and each photosensitive pixel corresponds to one first simulation pixel.

At block 150, a second part of the color-block image is converted into a second simulation image using a second interpolation algorithm.

The second part of the color-block image is outside the depth-of-field area. The second simulation image includes second simulation pixels arranged in a preset array, and each photosensitive pixel corresponds to one second simulation pixel.

The first interpolation algorithm is more complex than the second interpolation algorithm.

At block 160, the first simulation image and the second simulation image are merged to generate a simulation image corresponding to the color-block image.

With the image processing method according to embodiments of the present disclosure, the image sensor 200 can be controlled to output a suitable image by identify the depth-of-field area. In this way, a situation that it takes too much work to output a high quality image by the image sensor 200 can be avoided, thus reducing work time, improving work efficiency and improving the user experience.

Figure 4:
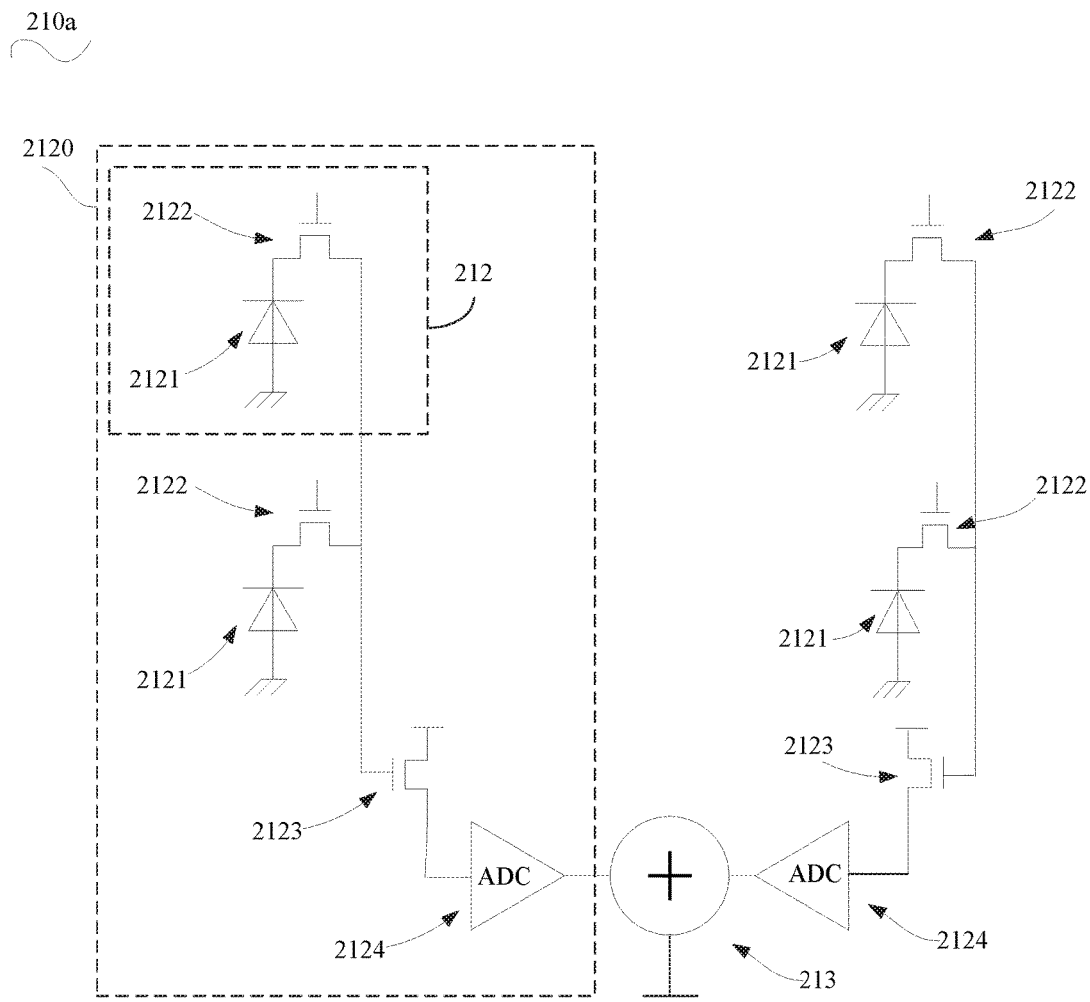
FIG. 4 is a schematic diagram illustrating a circuit of an image sensor according to an embodiment of the present disclosure.
Figure 5:
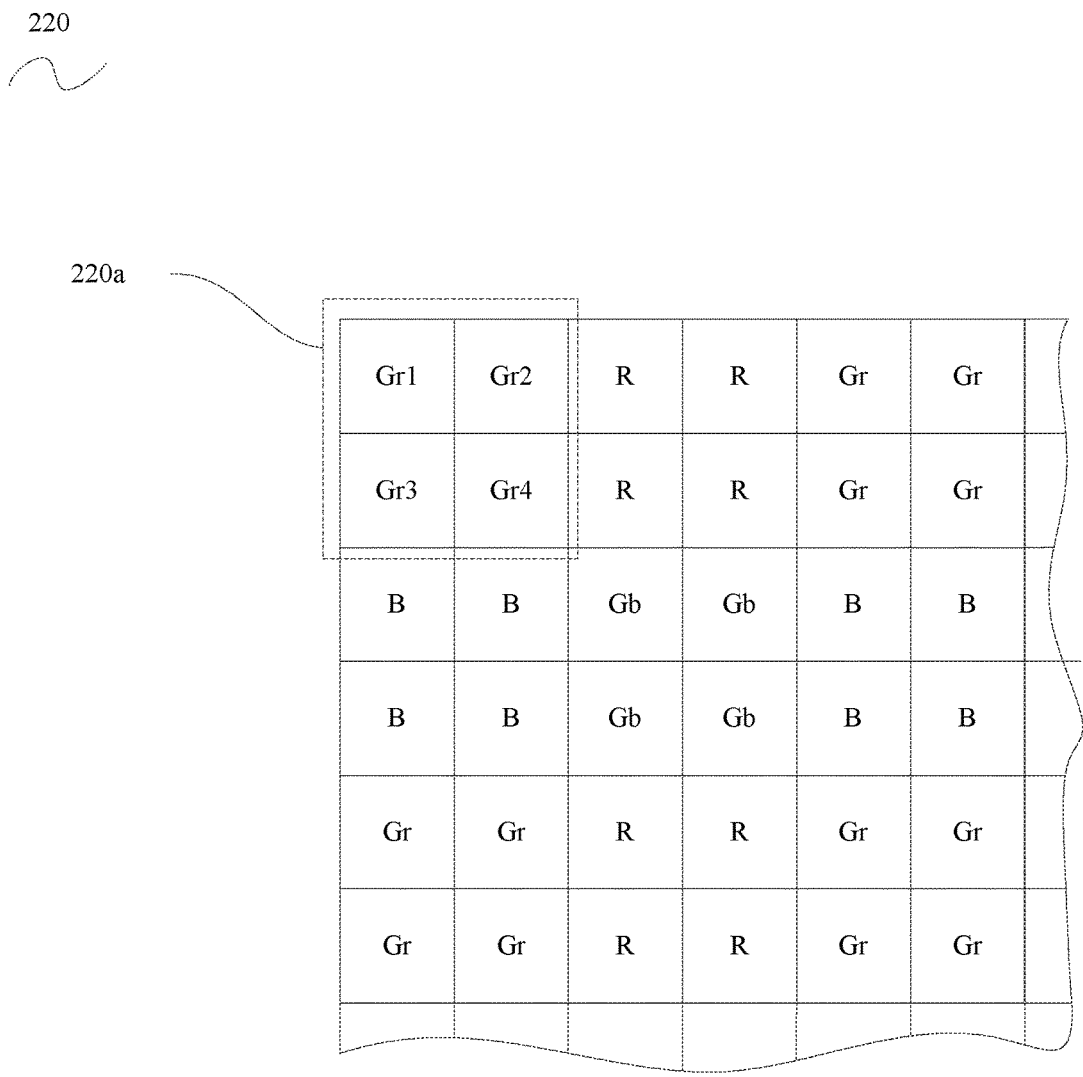
FIG. 5 is a schematic diagram of an array of filter units according to an embodiment of the present disclosure.

FIG. 4 is a schematic diagram illustrating a circuit of an image sensor according to an embodiment of the present disclosure. FIG. 5 is a schematic diagram of an array of filter units according to an embodiment of the present disclosure. FIGS. 2-5 are best viewed together.

Referring to FIGS. 2-5, the image sensor 200 according to an embodiment of the present disclosure includes an array 210 of photosensitive pixel units and an array 220 of filter units arranged on the array 210 of photosensitive pixel units.

Further, the array 210 of photosensitive pixel units includes a plurality of photosensitive pixel units 210a. Each photosensitive pixel unit 210a includes a plurality of adjacent photosensitive pixels 212. Each photosensitive pixel 212 includes a photosensitive element 2122 and a transmission tube 2122. The photosensitive element 2121 may be a photodiode, and the transmission tube 2122 may be a MOS transistor.

The array 220 of filter units includes a plurality of filter units 220a. Each filter unit 220a corresponds to one photosensitive pixel unit 210a.

In detail, in some examples, the filter units 220a are arranged in a Bayer array. In other words, four adjacent filter units 220a include one red filter unit, one blue filter unit and two green filter units.

Each photosensitive pixel unit 210a corresponds to a filter unit 220a with a same color. If a photosensitive pixel unit 210a includes n adjacent photosensitive elements 2121, one filter unit 220a covers n photosensitive elements 2121 in one photosensitive pixel unit 210a. The filter unit 220a may be formed integrally, or may be formed by assembling n separate sub filters.

In some implementations, each photosensitive pixel unit 210a includes four adjacent photosensitive pixels 212. Two adjacent photosensitive pixels 212 collectively form one photosensitive pixel subunit 2120. The photosensitive pixel subunit 2120 further includes a source follower 2123 and an analog-to-digital converter 2124. The photosensitive pixel unit 210a further includes an adder 213. A first electrode of each transmission tube 2122 in the photosensitive pixel subunit 2120 is coupled to a cathode electrode of a corresponding photosensitive element 2121. Second electrodes of all the transmission tubes 2122 are collectively coupled to a gate electrode of the source follower 2123 and coupled to an analog-to-digital converter 2124 via the source electrode of the source follower 2123. The source follower 2123 may be a MOS transistor. Two photosensitive pixel subunits 2120 are coupled to the adder 213 via respective source followers 2123 and respective analog-to-digital converters 2124.

In other words, four adjacent photosensitive elements 2121 in one photosensitive pixel unit 210a of the image sensor 200 according to an embodiment of the present disclosure collectively use one filter unit 220a with a same color as the photosensitive pixel unit 210a. Each photosensitive element 2121 is coupled to a transmission tube 2122 correspondingly. Two adjacent photosensitive elements 2121 collectively use one source follower 2123 and one analog-digital converter 2124. Four adjacent photosensitive elements 2121 collectively use one adder 213.

Further, four adjacent photosensitive elements 2121 are arranged in a 2-by-2 array. Two photosensitive elements 2121 in one photosensitive pixel subunit 2120 can be in a same row.

During an imaging process, when two photosensitive pixel subunits 2120 or four photosensitive elements 2121 covered by a same filter unit 220a are exposed to light simultaneously, pixels can be merged, and the merged image can be outputted.

In detail, the photosensitive element 2121 is configured to convert light into charges, and the amount of the charges is proportional to an illumination intensity. The transmission tube 2122 is configured to control a circuit to turn on or off according to a control signal. When the circuit is turned on, the source follower 2123 is configured to convert the charges generated through light illumination into a voltage signal. The analog-to-digital converter 2124 is configured to convert the voltage signal into a digital signal. The adder 213 is configured to add and output two digital signals, so as to provide the two digital signals to an image processing part connected to the image sensor 200.

Figure 6:
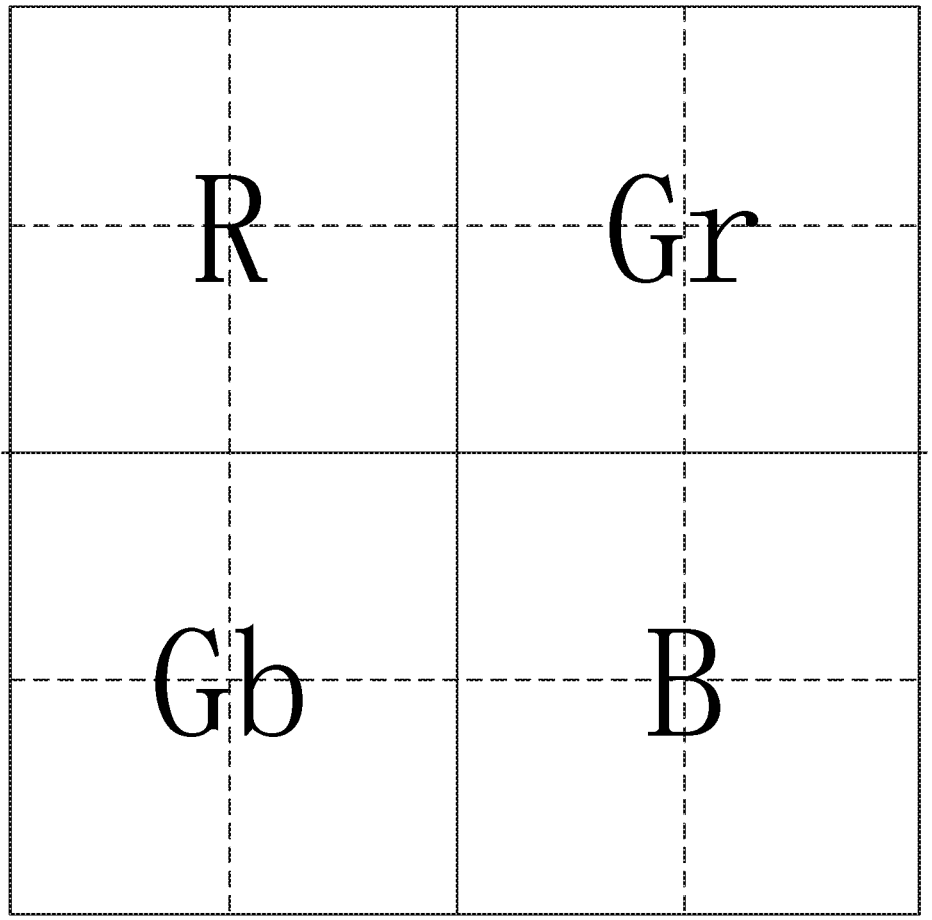
FIG. 6 is a schematic diagram of a merged image according to an embodiment of the present disclosure.

Referring to FIG. 6, take an image sensor 200 of 16M as an example. The image sensor 200 according to an embodiment of the present disclosure can merge photosensitive pixels of 16M into photosensitive pixels of 4M, i.e., the image sensor 200 outputs the merged image. The merged image includes the merged pixels arranged in a preset array, and the photosensitive pixels 212 in a same photosensitive pixel unit 210 are collectively output as one merged pixel. In some examples, each photosensitive pixel unit 210a includes four photosensitive pixels. After the merging, the photosensitive pixel 212 quadruples in size, such that the photo-sensibility of the photosensitive pixel 212 is increased. In addition, since most part of noise in the image sensor 200 is random, there may be noise points at one or two pixels. After four photosensitive pixels 212 are merged into a big photosensitive pixel 212, an effect of noise points on the big photosensitive pixel is reduced, i.e., the noise is weakened and SNR (signal to noise ratio) is improved.

However, when the size of the photosensitive pixel is increased, the number of pixels is decreased, and thus the resolution of the merged image is decreased.

During an imaging process, when four photosensitive elements 2121 covered by a same filter unit 220a are exposed to light in sequence, a color-block image may be output after an image process.

In detail, the photosensitive element 2121 is configured to convert light into charges, and the amount of charges is proportional to an illumination intensity. The transmission tube 2122 is configured to control a circuit to turn on or off according to a control signal. When the circuit is turned on, the source follower 2123 is configured to convert the charges generated by the photosensitive element 2121 under light illumination into a voltage signal. The analog-to-digital converter 2124 is configured to convert the voltage signal into a digital signal.

Referring to FIG. 7, take an image sensor 200 of 16M as an example. The image sensor 200 according to an embodiment of the present disclosure can output photosensitive pixels of 16M, i.e., the image sensor 200 outputs the color-block image. The color-block image includes image pixel units. The image pixel unit includes original pixels arranged in a 2-by-2 array. The size of the original pixel is the same as that of the photosensitive pixel 212. However, since filter unit 220a covering four adjacent photosensitive elements 2121 has a same color (i.e., although four photosensitive elements 2121 are exposed to light respectively, the filter unit 220a covers the four photosensitive elements 2121 has a same color), four adjacent original pixels in each image pixel unit of the output image have a same color, and thus the resolution of the image cannot be increased. Therefore, in order to increase the resolution of the image, the image needs to be further processed.

The image processing method according to an embodiment of the present disclosure is able to process the color-block image to obtain a simulation image with a higher resolution.

In some embodiments, when a merged image is output, four adjacent photosensitive pixels 212 with the same color can be output as one merged pixel. Accordingly, four adjacent photosensitive pixels in the merged image can be considered as being arranged in a typical Bayer array, and can be processed directly to output a merged true-color image. When a color-block image is output, each photosensitive pixel 212 is output separately. Since four adjacent photosensitive pixels 212 have a same color, four adjacent original pixels in an image pixel unit have a same color, which form an untypical Bayer array. However, the untypical Bayer array cannot be directly processed by the image processing part. In other words, when the image sensor 200 adopts a same image processing part for processing the image, in order to realize a compatibility of the true-color image outputs under two modes (i.e., the merged true-color image under a merged mode and the simulation true-color image under a color-block mode), it is required to convert the color-block image into the simulation image, or to convert the image pixel unit in an untypical Bayer array into pixels arranged in the typical Bayer array.

The simulation image includes simulation pixels arranged in the Bayer array. Each photosensitive pixel corresponds to one simulation pixel. One simulation pixel in the simulation image corresponds to an original pixel located at the same position as the simulation pixel in the color-block image.

Figure 8:
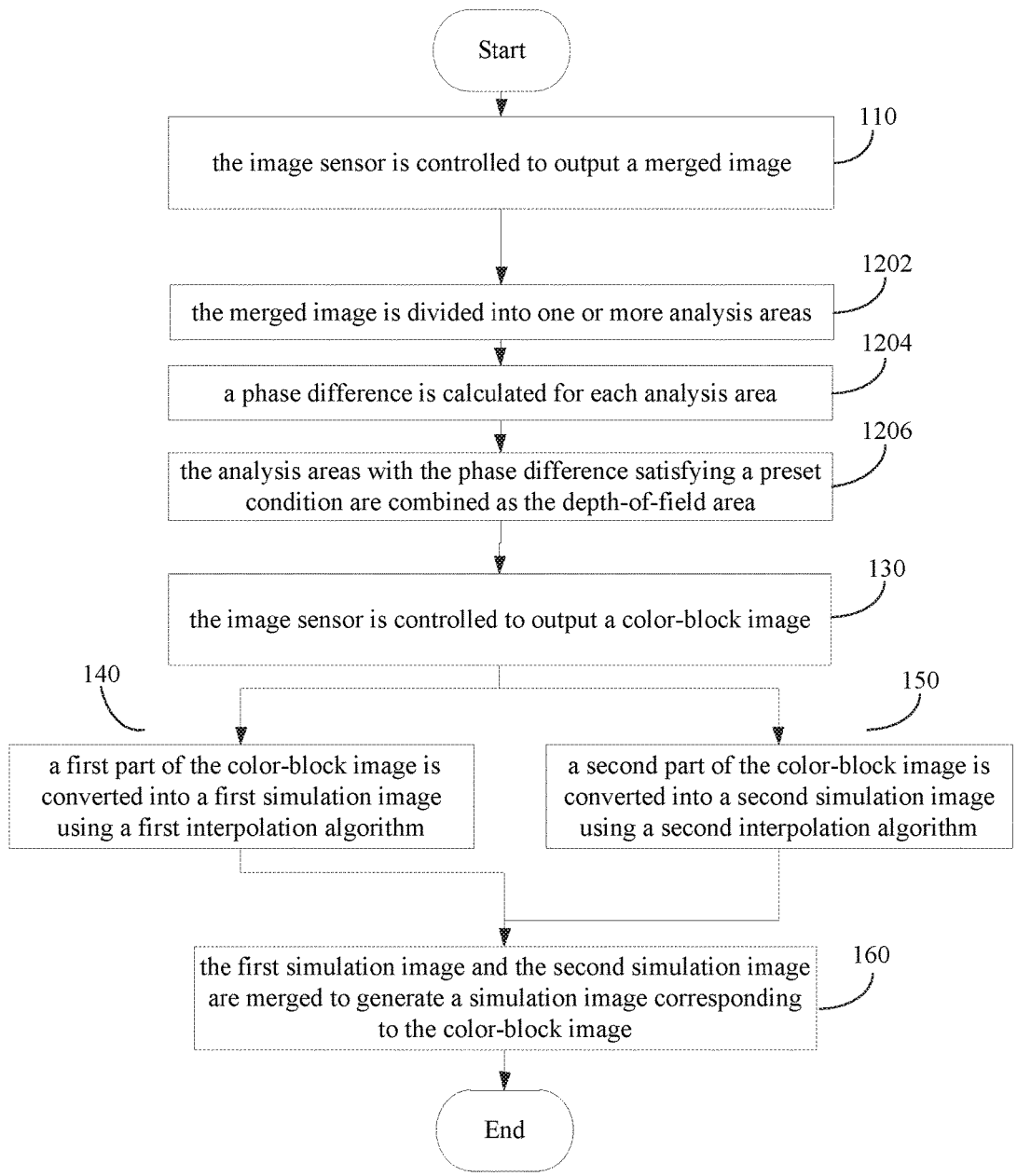
FIG. 8 is a flow chart of an image processing method according to another embodiment of the present disclosure

Referring to FIG. 8, in some implementations, the act at block 120 includes the followings.

It is to be understood that, the merged image is acquired with PDAF (phase detection auto focus) technology.

At block 1202, the merged image is divided into one or more analysis areas.

At block 1204, a phase difference is calculated for each analysis area.

At block 1206, the analysis areas with the phase difference satisfying a preset condition are combined as the depth-of-field area.

In some implementations, the merged image is divided into M*N analysis areas. The phase difference is calculated for each of the M*N analysis areas.

In some implementations, if the phase difference is close to 0, it indicates that the analysis area is in the depth-of-field area. Since the depth of field generally has a range, the analysis area having a phase difference within a preset phase difference range can be considered as being in the depth-of-field area.

Figure 9:
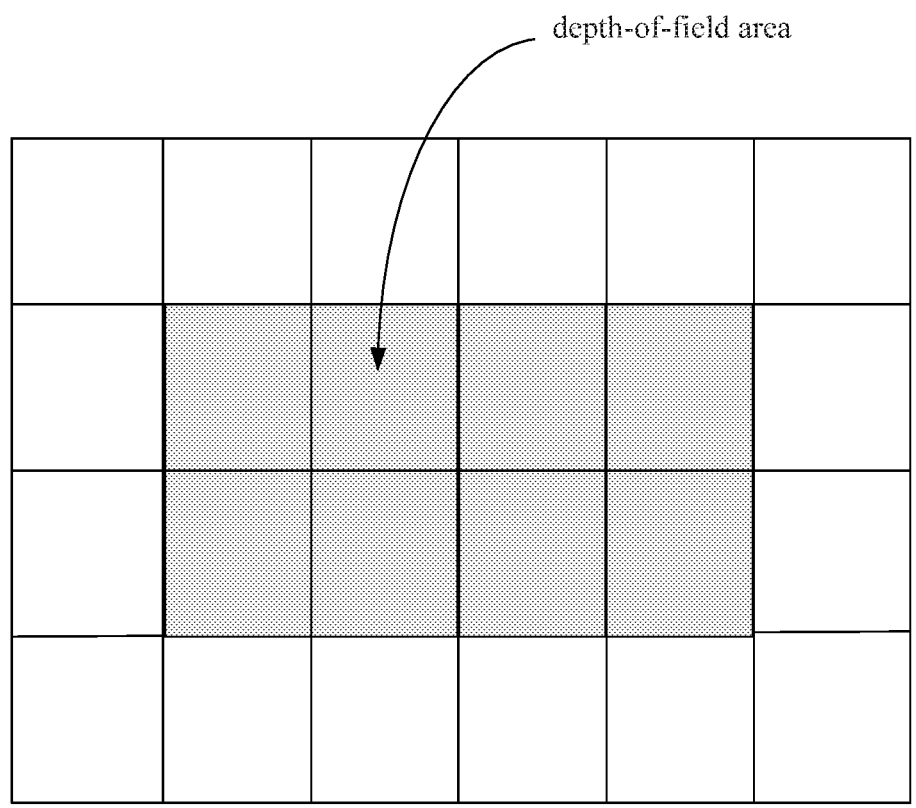
FIG. 9 is a schematic diagram of depth-of-field area according to an embodiment of the present disclosure.

For example, as illustrated in FIG. 9, the merged image is divided into 6*5 analysis areas, and the gray analysis areas are combined as the depth-of-field area.

During an imaging process, the part in the depth-of-field area may be imaged clearly, which is interested by a user, while the part outside the depth-of-field area may be imaged unclearly. Converting the color-block image into the simulation image using the first interpolation algorithm is complex. Generally, the complexity of the algorithm includes a time complexity and a space complexity. If the color-block image is converted into the simulation image using the first interpolation algorithm, huge storage resource is occupied, and long time is consumed. Therefore, in embodiments of the present disclosure only the first part of the image within the depth-of-field area is converted using the first interpolation algorithm, while the second part of the image outside the depth-of-field area is converted simply or using the second interpolation algorithm with a less complexity than the first interpolation algorithm, such that an output image in a typical Bayer array is obtained.

Figure 10:
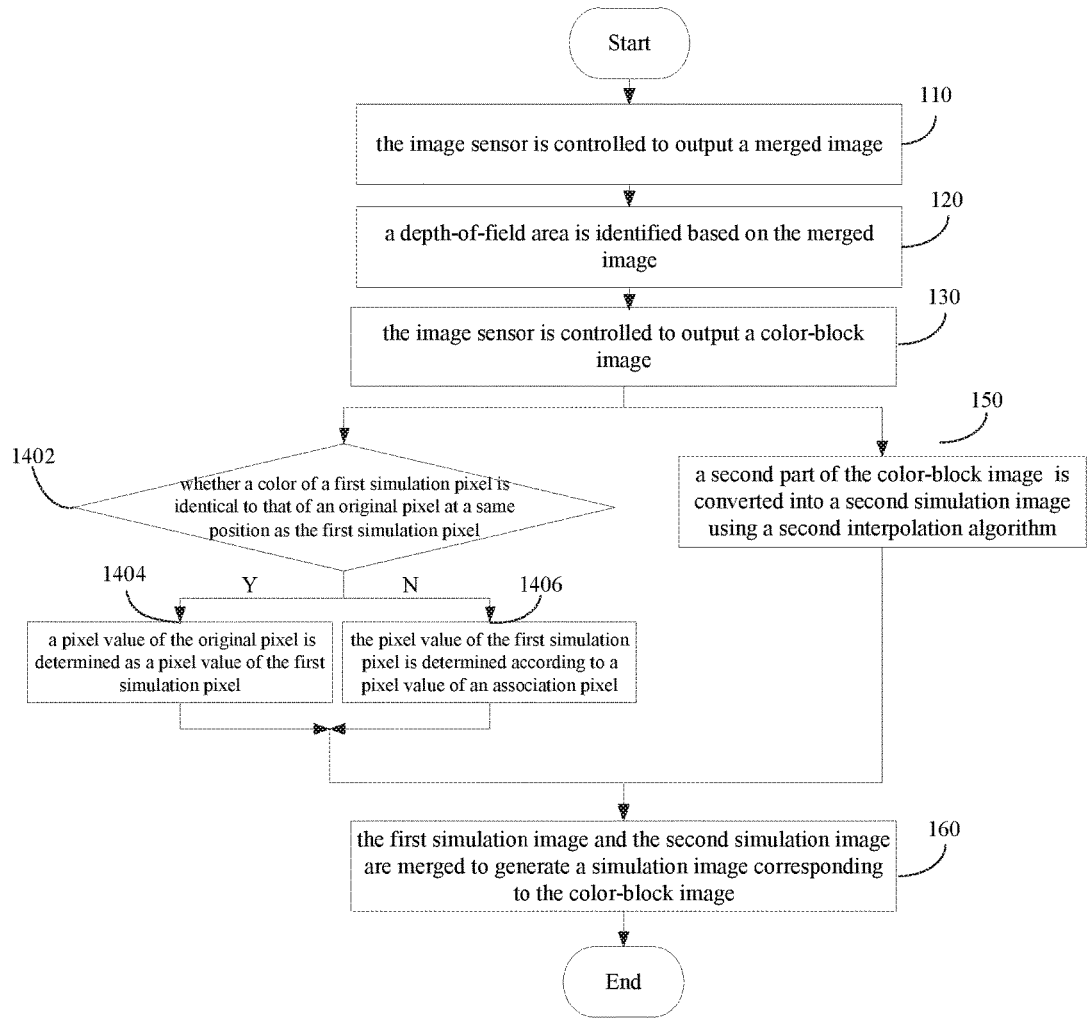
FIG. 10 is a flow chart of an image processing method according to an embodiment of the present disclosure.

Referring to FIG. 10, in some implementations, the act at block 140 includes the followings.

At block 1402, it is determined whether a color of a first simulation pixel is identical to that of an original pixel at a same position as the first simulation pixel, if yes, an act at block 1404 is executed, otherwise, an act at block 1406 is executed.

At block 1404, a pixel value of the original pixel is determined as a pixel value of the first simulation pixel.

At block 1406, the pixel value of the first simulation pixel is determined according to a pixel value of an association pixel.

The association pixel is selected from an image pixel unit with a same color as the first simulation pixel and adjacent to the original pixel.

Figure 11:
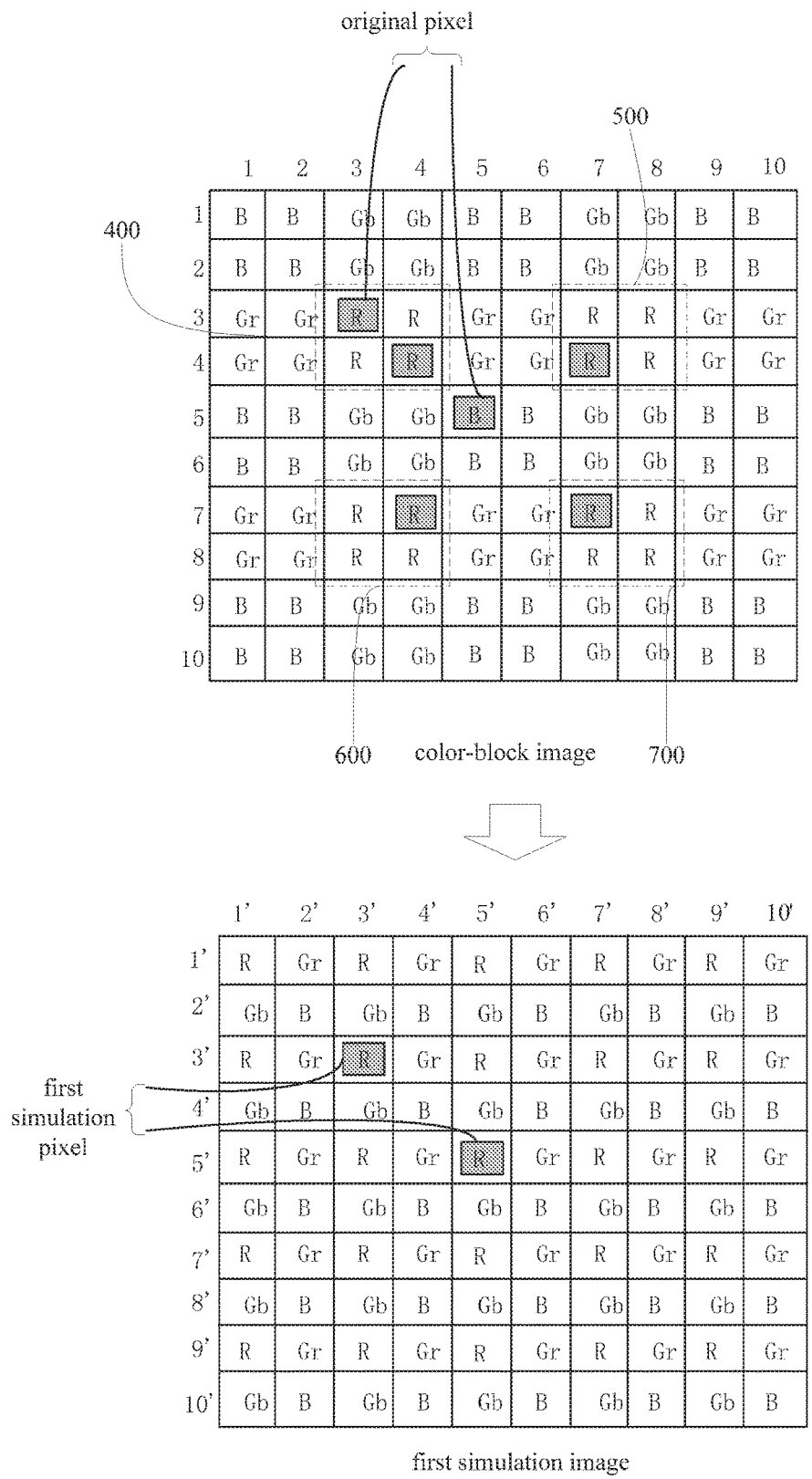
FIG. 11 is a schematic diagram illustrating a process of converting a color-block image into a first simulation image according to an embodiment of the present disclosure.

Referring to FIG. 11, the first interpolation algorithm is illustrated. For the first simulation pixels R3'3' and R5'5', the corresponding original pixels are R33 and B55.

When the first simulation pixel R3'3' is to be obtained, since the first simulation pixel R3'3' has the same color as the corresponding original pixel R33, the pixel value of the original pixel R33 is directly determined as the pixel value of the first simulation pixel R3'3' during conversion.

When the first simulation pixel R5'5' is to be obtained, since the first simulation pixel R5'5' has a color different from that of the corresponding original pixel B55, the pixel value of the original pixel B55 cannot be directly determined as the pixel value of the first simulation pixel R5'5', and it is required to calculate the pixel value of the first simulation pixel R5'5' according to an association pixel of the first simulation pixel R5'5' by a first interpolation algorithm.

It should be noted that, a pixel value of a pixel mentioned in the context should be understood in a broad sense as a color attribute value of the pixel, such as a color value.

The association pixel is selected from an association pixel unit. There may be more than one association pixel unit for each first simulation pixel, for example, there may be four association pixel units, in which the association pixel units have the same color as the first simulation pixel and are adjacent to the original pixel at the same position as the first simulation pixel.

It should be noted that, "adjacent" here should be understood in a broad sense. Take FIG. 11 as an example, the first simulation pixel R5'5' corresponds to the original pixel B55. The image pixel units 400, 500, 600 and 700 are selected as the association pixel units, but other red image pixel units far away from the image pixel unit where the original pixel B55 is located are not selected as the association pixel units. In each association pixel unit, the red original pixel closest to the original pixel B55 is selected as the association pixel, which means that the association pixels of the first simulation pixel R5'5' include the original pixels R44, R74, R47 and R77. The first simulation pixel R5'5' is adjacent to and has the same color as the original pixels R44, R74, R47 and R77.

Figure 12:
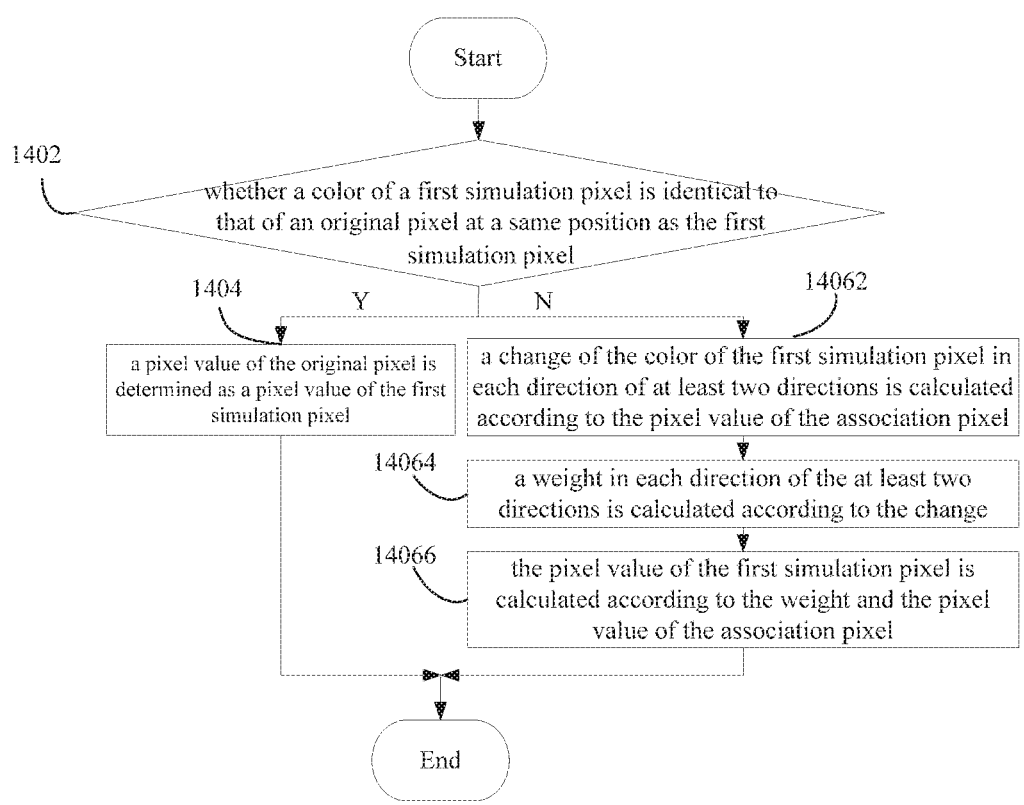
FIG. 12 is a flow chart of an image processing method according to an embodiment of the present disclosure.

Referring to FIG. 12, in some implementations, the act at block 1406 (i.e., determining the pixel value of the first simulation pixel according to a pixel value of an association pixel) includes the followings.

At block 14062, a change of the color of the first simulation pixel in each direction of at least two directions is calculated according to the pixel value of the association pixel.

At block 14064, a weight in each direction of the at least two directions is calculated according to the change.

At block 14066, the pixel value of the first simulation pixel is calculated according to the weight and the pixel value of the association pixel.

In detail, the first interpolation processing is realized as follows: with reference to energy changes of the image in different directions and according to weights of the association pixels in different directions, the pixel value of the first simulation pixel is calculated by a linear interpolation. From the direction having a smaller energy change, it can get a higher reference value, i.e., the weight for this direction in the first interpolation is high.

In some examples, for sake of convenience, only the horizontal direction and the vertical direction are considered.

The pixel value of the first simulation pixel R5'5' is obtained by a first interpolation algorithm based on the original pixels R44, R74, R47 and R77. Since there is no original pixel with a same color as the first simulation pixel (i.e., R) in the horizontal direction and the vertical direction of the original pixel R55 corresponding the first simulation pixel R5'5', a component of this color (i.e., R) in each of the horizontal direction and the vertical direction is calculated according to the association pixels. The components in the horizontal direction are R45 and R75, the components in the vertical direction are R54 and R57. All the components can be calculated according to the original pixels R44, R74, R47 and R77.

In detail, R45=R44*2/3+R47*1/3, R75=2/3*R74+1/3*R77, R54=2/3*R44+1/3*R74, R57=2/3*R47+1/3*R77.

The change of color and the weight in each of the horizontal direction and the vertical direction are calculated respectively. In other words, according to the change of color in each direction, the reference weight in each direction used in the first interpolation algorithm is determined. The weight in the direction with a small change is high, while the weight in the direction with a big change is low. The change in the horizontal direction is X1=|R45-R75||. The change in the vertical direction is X2=|R54-R57|, W1=X1/(X1+X2), W2=X2/(X1+X2).

After the above calculation, the pixel value of the first simulation pixel R5'5' can be calculated as R5'5'=(2/3*R45+ 1/3*R75)*W2 +(2/3*R54+1/3*R57)*W1. It can be understood that, if X1>X2, then W1>W2. The weight in the horizontal direction is W2, and the weight in the vertical direction is W1, vice versa.

Accordingly, the pixel value of the first simulation pixel can be calculated by the first interpolation algorithm. After the calculations on the association pixels, the original pixels can be converted into the first simulation pixels arranged in the typical Bayer array. In other words, four adjacent first simulation pixels arranged in the 2-by-2 array include one red first simulation pixel, two green first simulation pixels and one blue first simulation pixel.

It should be noted that, the first interpolation processing is not limited to the above-mentioned method, in which only the pixel values of pixels with a same color as the first simulation pixel in the vertical direction and the horizontal direction are considered during calculating the pixel value of the first simulation pixel. In other embodiments, pixel values of pixels with other colors can also be considered.

Figure 13:
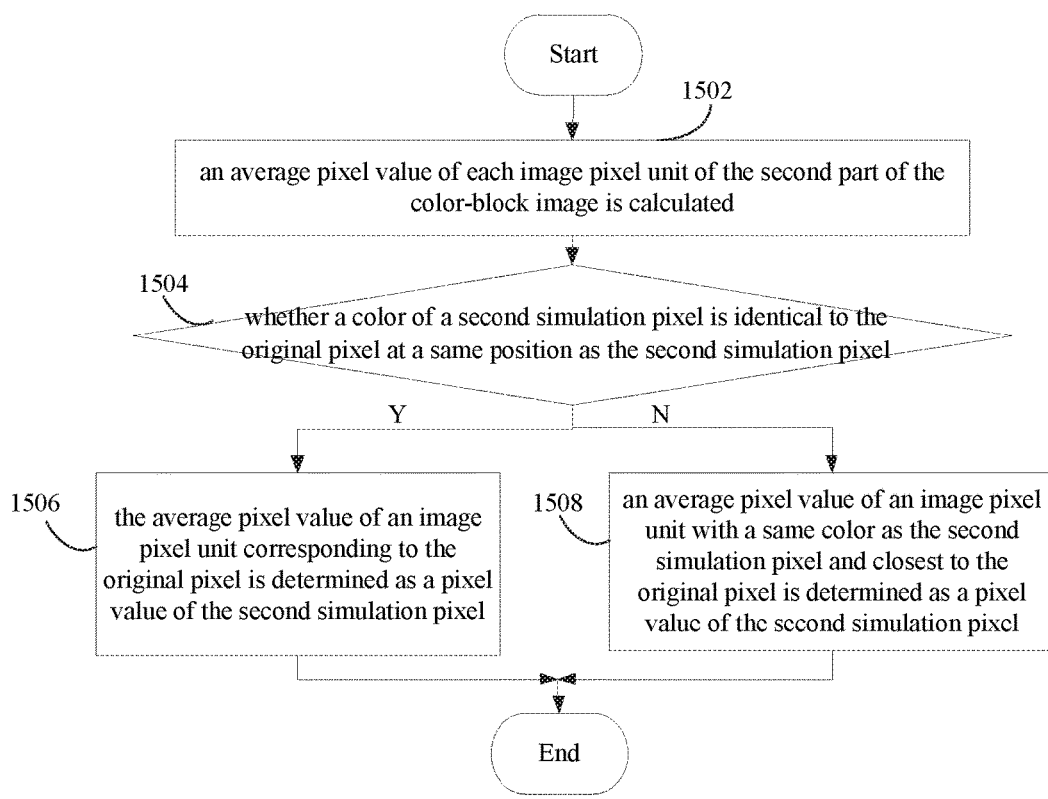
FIG. 13 is a flow chart of an image processing method according to an embodiment of the present disclosure.

Referring to FIG. 13, in some embodiments, the act at block 150 includes the followings.

At block 1502, an average pixel value of each image pixel unit of the second part of the color-block image is calculated.

At block 1504, it is determined whether a color of a second simulation pixel is identical to that of the original pixel at a same position as the second simulation pixel.

At block 1506, when the color of the second simulation pixel is identical to that of the original pixel at the same position as the second simulation pixel, the average pixel value of an image pixel unit corresponding to the original pixel is determined as a pixel value of the second simulation pixel.

At block 1508, when the color of the second simulation pixel is different from that of the original pixel at the same position as the second simulation pixel, an average pixel value of an image pixel unit with a same color as the second simulation pixel and closest to the original pixel is determined as the pixel value of the second simulation pixel.

Figure 14:
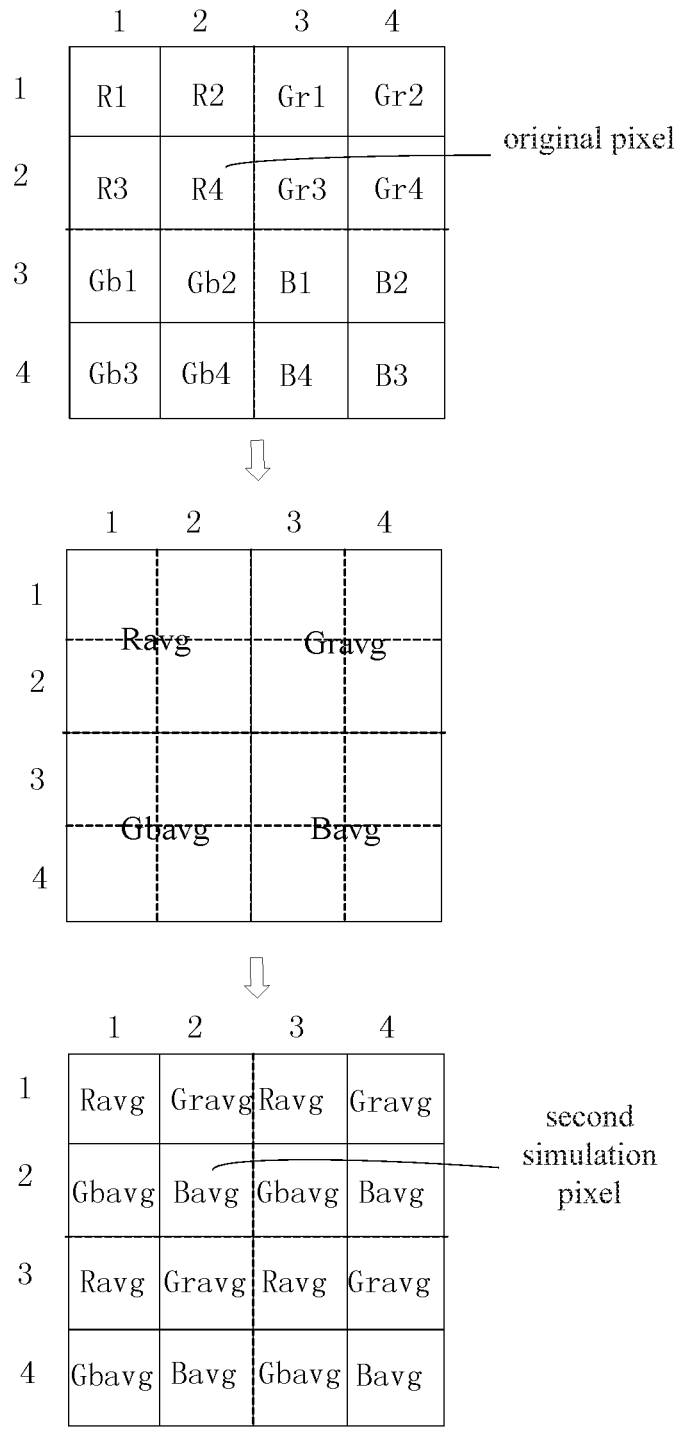
FIG. 14 is a schematic diagram illustrating a process of converting a color-block image into a second simulation image according to an embodiment of the present disclosure.

Referring to FIG. 14, take FIG. 14 as an example to illustrate the second interpolation algorithm. The average pixel value of each image pixel unit is calculated as Ravg= (R1+R2+R3+R4)/4, Gravg=(Gr1+Gr2+Gr3+Gr4)/4, Gbavg=(Gb1+Gb2+Gb3+Gb4)/4 and Bavg=(B1+B2+B3+ B4)/4. The pixel values of the original pixels R11, R12, R13 and R14 all equal to Ravg. The pixel values of the original pixels Gr31, Gr32, Gr41 and Gr42 all equal to Gravg. The pixel values of the original pixels Gb13, Gb14, Gb23 and Gb24 all equal to Gbave. The pixel values of the original pixels B33, B34, B43 and B44 all equal to Bavg. The second simulation pixel B22 is taken as an example, the corresponding original pixel having the same positon as the second simulation pixel B22 is R22. Since the color of the second simulation pixel B22 is different from that of the corresponding original pixel R22, the pixel value of the second simulation pixel B2 may be determined as the pixel value corresponding to the closest blue filter, i.e., the pixel value Bavg of any of original pixels B33, B34, B43 and B34.

For different parts of the image, the original pixels are converted into the simulation pixels in different manners. Therefore, the color-block image is converted into the simulation image. Since the filters in the Bayer array are adopted when shooting the image, the SNR of the image is improved. During the image processing procedure, the interpolation processing is performed on the color-block image, such that the distinguishability and resolution of the image can be improved.

Further, for different parts within the depth-of-field area and outside the depth-of-field area, different interpolation algorithms are used. Therefore, the memory resource and the computing time consumed are reduced without affecting the quality of the image.

Figure 15:
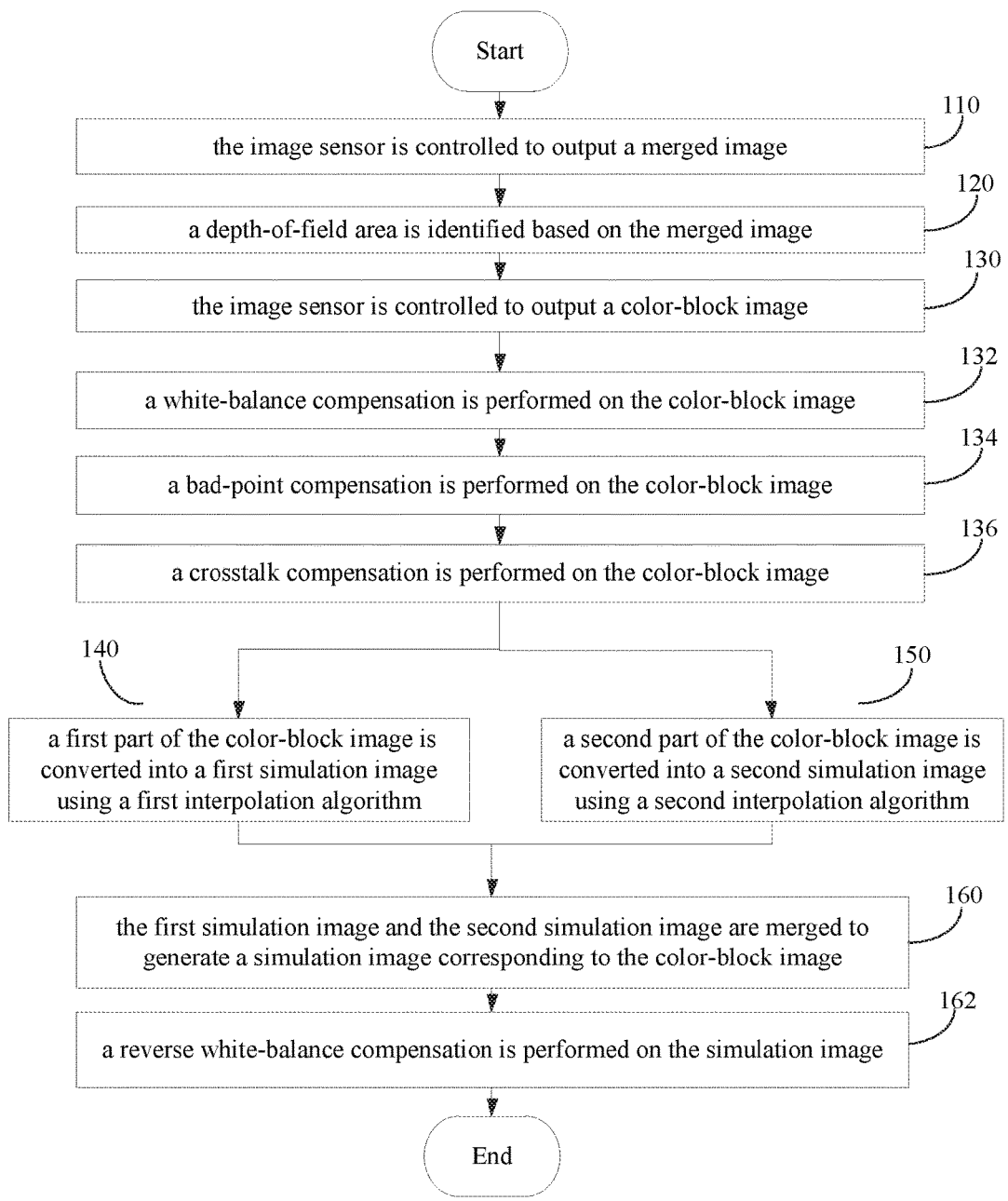
FIG. 15 is a flow chart of an image processing method according to an embodiment of the present disclosure.

Referring to FIG. 15, in some embodiments, before converting the color-block image into the simulation image, the method further includes performing a white-balance compensation on the color-block image, as illustrated at block 132.

Accordingly, after obtaining the simulation image, the method further includes performing a reverse white-balance compensation on the simulation image, as illustrated at block 162.

In detail, in some examples, when converting the color-block image into the simulation image, during the interpolation, the red and blue simulation pixels not only refer to the color weights of original pixels having the same color as the simulation pixels, but also refer to the color weights of original pixels with the green color. Thus, it is required to perform the white-balance compensation before the interpolation to exclude an effect of the white-balance in the interpolation calculation. In order to avoid damaging the white-balance of the color-block image, it is required to perform the reverse white-balance compensation on the simulation image after the interpolation according to gain values of the red, green and blue colors in the compensation.

In this way, the effect of the white-balance in the interpolation calculation can be excluded, and the simulation image obtained after the interpolation can keep the white-balance of the color-block image.

Referring to FIG. 15 again, in some implementations, before converting the color-block image into the simulation image, the method further includes performing a bad-point compensation on the color-block image, as illustrated at block 134.

It can be understood that, limited by the manufacturing process, there may be bad points in the image sensor 200. The bad point presents a same color all the time without varying with the photo-sensibility, which affects quality of the image. In order to ensure an accuracy of the interpolation and prevent from the effect of the bad points, it is required to perform the bad-point compensation before the interpolation.

In detail, during the bad-point compensation, the original pixels are detected. When an original pixel is detected as the bad point, the bad-point compensation is performed according to pixel values of other original pixels in the image pixel unit where the original pixel is located.

In this way, the effect of the bad point on the interpolation can be avoided, thus improving the quality of the image.

Referring to FIG. 15 again, in some implementations, before converting the color-block image into the simulation image, the method includes performing a crosstalk compensation on the color-block image, as illustrated at block 136.

In detail, four photosensitive pixels 212 in one photosensitive pixel unit 210a are covered by the filters with the same color, and the photosensitive pixels 212 have different photo-sensibilities, such that fixed spectrum noise may occur in pure-color areas in the simulation true-color image outputted after converting the low brightness image, and the quality of the image may be affected. Therefore, it is required to perform the crosstalk compensation on the color-block image.

Figure 16:
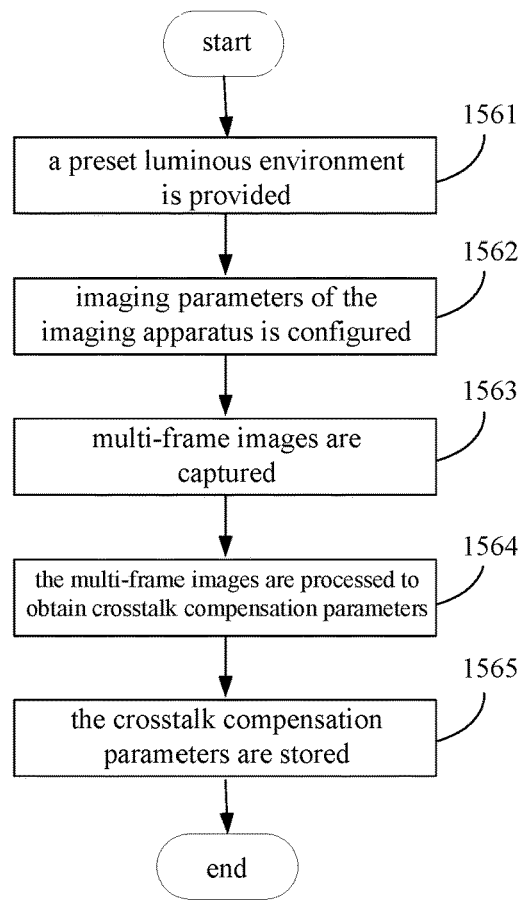
FIG. 16 is a flow chart of performing a crosstalk compensation according to an embodiment of the present disclosure.

Referring to FIG. 16, in some implementations, in order to perform the crosstalk compensation, it is required to obtain the compensation parameters during the manufacturing process of the image sensor of the imaging apparatus, and to store the parameters related to the crosstalk compensation into the storage of the imaging apparatus or the electronic device provided with the imaging apparatus, such as the mobile phone or tablet computer In some implementations, setting the compensation parameters may include the followings.

At block 1561, a preset luminous environment is provided.

At block 1562, imaging parameters of the imaging apparatus is configured.

At block 1563, multi-frame images are captured.

At block 1564, the multi-frame images are processed to obtain crosstalk compensation parameters.

At block 1565, the crosstalk compensation parameters are stored.

The preset luminous environment, for example, may include an LED uniform plate having a color temperature of about 5000K and a brightness of about 1000 lux. The imaging parameters may include a gain value, a shutter value and a location of a lens. After setting the related parameters, the crosstalk compensation parameters can be obtained.

During the process, multiple color-block images are obtained using the preset imaging parameters in the preset luminous environment, and combined into one combination color-block image, such that the effect of noise caused by using a single color-block image as reference can be reduced.

Figure 17:
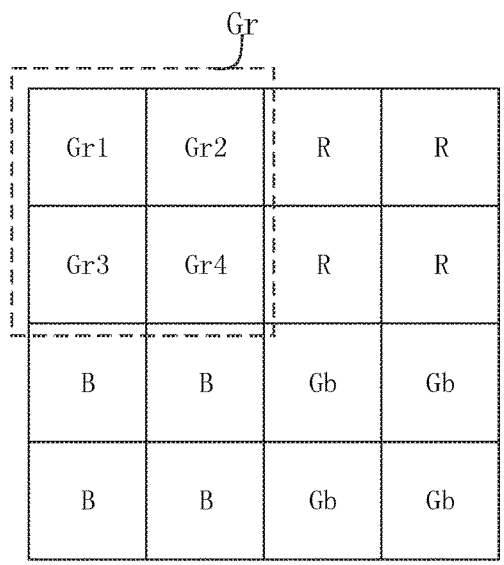
FIG. 17 is a schematic diagram showing an image pixel unit of a color-block image according to an embodiment of the present disclosure.

Referring to FIG. 17, take the image pixel unit Gr as an example. The image pixel unit Gr includes original pixels Gr1, Gr2, Gr3 and Gr4. The purpose of the crosstalk compensation is to adjust the photosensitive pixels which may have different photo-sensibilities to have the same photo-sensibility. An average pixel value of the image pixel unit is $Gr\_avg=(Gr1+Gr2+Gr3+Gr4)/4$, which represents an average level of photo-sensibilities of the four photosensitive pixels. By configuring the average value as a reference value, ratios of $Gr1/Gr\_avg$, $Gr2/Gr\_avg$, $Gr3/Gr\_avg$ and $Gr4/Gr\_avg$ are calculated. It can be understood that, by calculating a ratio of the pixel value of each original pixel to the average pixel value of the image pixel unit, a deviation between each original pixel and the reference value can be reflected. Four ratios can be recorded in a storage of a related device as the compensation parameters, and can be retrieved during the imaging process to compensate for each original pixel, thus reducing the crosstalk and improving the quality of the image.

Generally, after setting the crosstalk compensation parameters, verification is performed on the parameters to determine the accuracy of the parameters.

During the verification, a color-block image is obtained with the same luminous environment and same imaging parameters as the preset luminous environment and the preset imaging parameters, and the crosstalk compensation is performed on the color-block image according to the calculated compensation parameters to calculate compensated Gr'_avg, Gr'1/Gr'_avg, Gr'2/Gr'_avg, Gr3'3/Gr'_avg and Gr'4/Gr'_avg. The accuracy of parameters can be determined according to the calculation results from a macro perspective and a micro perspective. From the micro perspective, when a certain original pixel after the compensation still has a big deviation which is easy to be sensed by the user after the imaging process, it means that the parameters are not accurate. From the macro perspective, when there are too many original pixels with deviations after the compensation, the deviations as a whole can be sensed by the user even if a single original pixel has a small deviation, and in this case, the parameters are also not accurate. Thus, a ratio threshold can be set for the micro perspective, and another ratio threshold and a number threshold can be set for the macro perspective. In this way, the verification can be performed on the crosstalk compensation parameters to ensure the accuracy of the compensation parameters and to reduce the effect of the crosstalk on the quality of the image.

Figure 18:
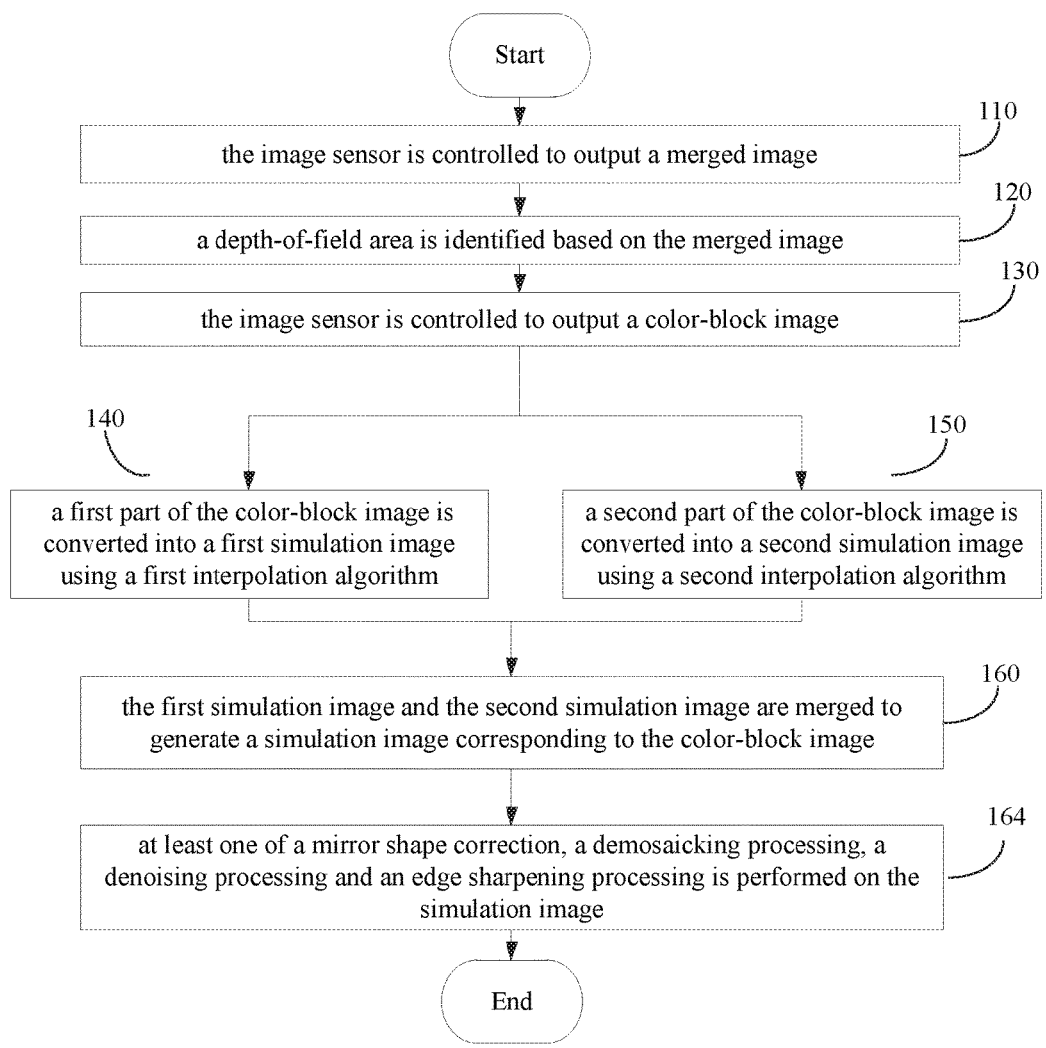
FIG. 18 is a flow chart of an image processing method according to an embodiment of the present disclosure.

Referring to FIG. 18, in some implementations, after obtaining the simulation image, the method further includes performing at least one of a mirror shape correction, a demosaicking processing, a denoising processing and an edge sharpening processing on the simulation image, as illustrated at block 164.

It can be understood that, after the color-block image is converted into the simulation image, the simulation pixels are arranged in the typical Bayer array. The simulation image can be processed, during which, the mirror shape correction, the demosaicking processing, the denoising processing and the edge sharpening processing are included, such that the simulation true-color image can be obtained and output to the user.

In another aspect, the present disclosure also provides an image processing apparatus.

Figure 19:
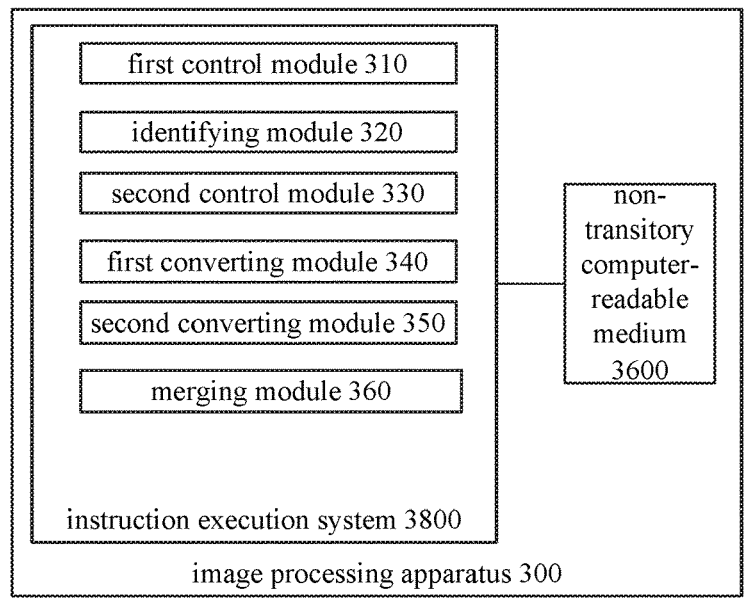
FIG. 19 is a block diagram of an image processing apparatus according to an embodiment of the present disclosure.

FIG. 19 is a block diagram of an image processing apparatus according to an embodiment of the present disclosure. Referring to FIG. 19, an image processing apparatus 300 is illustrated. The image processing apparatus 300 is applied in an electronic device. The electronic device includes an imaging apparatus including an image sensor 200. As illustrated above in FIGS. 2-5, the image sensor 200 includes an array 210 of photosensitive pixel units and an array 220 of filter units arranged on the array 210 of photosensitive pixel units. Each filter unit 220a corresponds to one photosensitive pixel unit 210a, and each photosensitive pixel unit 210a includes a plurality of photosensitive pixels 212. The image processing apparatus 300 includes a non-transitory computer-readable medium 3600 and an instruction execution system 3800. The non-transitory computer-readable medium 3600 includes computer-executable instructions stored thereon. The instruction execution system 3800 is configured by the instructions stored in the medium 3600 to implement at least one of a first control module 310, an identifying module 320, a second control module 330, a first converting module 340, a second converting module 350 and a merging module 360.

The first control module 310 is configured to control the image sensor 200 to output a merged image. The merged image includes an array of merged pixels, and the photosensitive pixels 212 in a same photosensitive pixel unit 210a are collectively outputted as one merged pixel. The identifying module 320 is configured to identify a depth-of-field area based on the merged image. The second control module 330 is configured to control the image sensor to output a color-block image. The color-block image includes image pixel units arranged in a preset array, and each image pixel unit includes a plurality of original pixels. Each photosensitive pixel unit 210a corresponds to one image pixel unit, and each photosensitive pixel 212 corresponds to one original pixel. The first converting module 340 is configured to convert a first part of color-block image into a first simulation image using a first interpolation algorithm. The first part of the color-block image is within the depth-of-field area. The first simulation image includes first simulation pixels arranged in a preset array, and each photosensitive pixel corresponds to one first simulation pixel. The second converting module 350 is configured to convert a second part of the color-block image into a second simulation image using a second interpolation algorithm. The second part of the color-block image is outside the depth-of-field area. The second simulation image includes second simulation pixels arranged in a preset array, and each photosensitive pixel corresponds to one second simulation pixel. The first interpolation algorithm is more complex than the second interpolation algorithm. The merging module 360 is configured to merge the first simulation image and the second simulation image to generate a simulation image corresponding to the color-block image.

In other words, the act at block 110 can be implemented by the first control module 310. The act at block 120 can be implemented by the identifying module 320. The act at block 130 can be implemented by the second control module 330. The act at block 140 can be implemented by the first converting module 340. The act at block 150 can be implemented by the second converting module 350. The act at block 160 can be implemented by the merging module 360.

Figure 20:
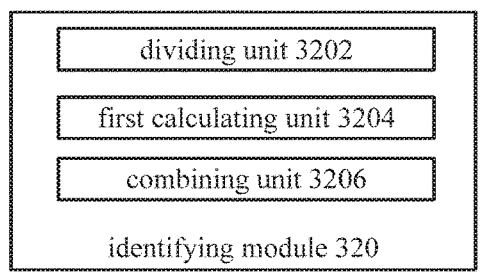
FIG. 20 is a block diagram of an identifying module according to an embodiment of the present disclosure.

Referring to FIG. 20, the identifying module 320 includes a dividing unit 3202, a first calculating unit 3204, and a combining unit 3206. The dividing unit 3202 is configured to divide the merged image into one or more analysis areas arranged in an array. The first calculating unit 3204 is configured to calculate a phase difference for each analysis area. The combining unit 3206 is configured to combine the analysis areas with the phase difference satisfying a preset condition as the depth-of-field area.

In other words, the act at block 1202 can be implemented by the dividing unit 3202. The act at block 1204 can be implemented by the first calculating unit 3204. The act at block 1206 can be implemented by the combining unit 3206.

Figure 21:
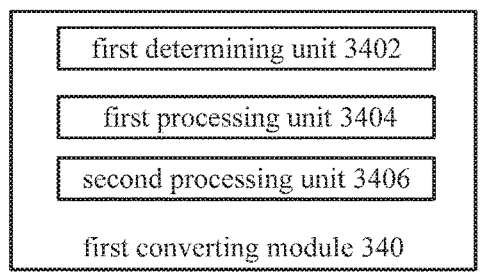
FIG. 21 is a block diagram of a first converting module according to an embodiment of the present disclosure.

Referring to FIG. 21, in some implementations, the first converting module 340 includes a first determining unit 3402, a first processing unit 3404 and a second processing unit 3406. The first determining unit 3402 is configured to determine whether a color of a first simulation pixel is identical to that of an original pixel at a same position as the first simulation pixel. The first processing unit 3404 is configured to determine a pixel value of the original pixel as a pixel value of the first simulation pixel, when the color of the first simulation pixel is identical to that of the original pixel at the same position as the first simulation pixel. The second processing unit 3406 is configured to determine the pixel value of the first simulation pixel according to a pixel value of an association pixel, when the color of the first simulation pixel is different from that of the original pixel at the same position as the first simulation pixel, in which the association pixel is selected from an image pixel unit with a same color as the first simulation pixel and adjacent to the original pixel.

In other words, the act at block 1402 can be implemented by the first determining unit 3402. The act at block 1404 can be implemented by the first processing unit 3404. The act at block 1406 can be implemented by the second processing unit 3406.

Figure 22:
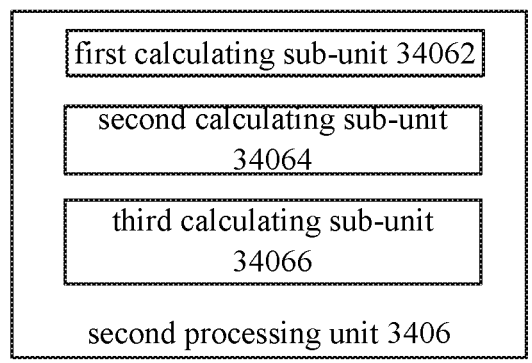
FIG. 22 is a block diagram of a second processing unit according to an embodiment of the present disclosure.

Referring to FIG. 22, the second processing unit 3406 includes a first calculating sub-unit 34062, a second calculating sub-unit 34064 and a third calculating sub-unit 34066. The first calculating sub-unit 34062 is configured to calculate a change of the color of the first simulation pixel in each direction of at least two directions according to the pixel value of the association pixel. The second calculating sub-unit 34064 is configured to calculate a weight in each direction of the at least two directions according to the change. The third calculating sub-unit 34066 is configured to calculate the pixel value of the first simulation pixel according to the weight and the pixel value of the association pixel.

In other words, the act at block 14062 can be implemented by the first calculating sub-unit 34062. The act at block 14064 can be implemented by the second calculating sub-unit 34064. The act at block 14066 can be implemented by the third calculating sub-unit 34066.

Figure 23:
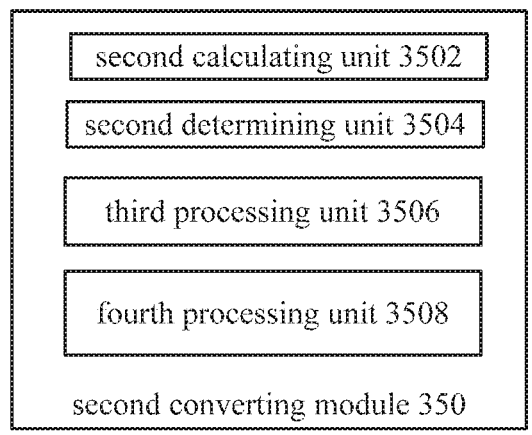
FIG. 23 is a block diagram of a second converting module according to an embodiment of the present disclosure.

Referring to FIG. 23, in some implementations, the second converting module 350 includes a second calculating unit 3502, a second determining unit 3504, a third processing unit 3506 and a fourth processing unit 3508. The second calculating unit 3502 is configured to calculate an average pixel value of each image pixel unit of the second part of the color-block image outside the depth-of-field area. The second determining unit 3504 is configured to determine whether a color of a second simulation pixel is identical to that of the original pixel at a same position as the second simulation pixel. The third processing unit 3506 is configured to determine the average pixel value of an image pixel unit corresponding to the original pixel as a pixel value of the second simulation pixel, when the color of the second simulation pixel is identical to that of the original pixel at the same position as the second simulation pixel. The fourth processing unit 3508 is configured to determine an average pixel value of an image pixel unit with a same color as the second simulation pixel and closest to the original pixel as the pixel value of the second simulation pixel, when the color of the second simulation pixel is different from that of the original pixel at the same position as the second simulation pixel.

In other words, the act at block 1502 can be implemented by the second calculating unit 3502. The act at block 1504 can be implemented by the second determining unit 3504. The act at block 1506 can be implemented by the third processing unit 3506. The act at block 1508 can be implemented by the fourth processing unit 3508.

Figure 24:
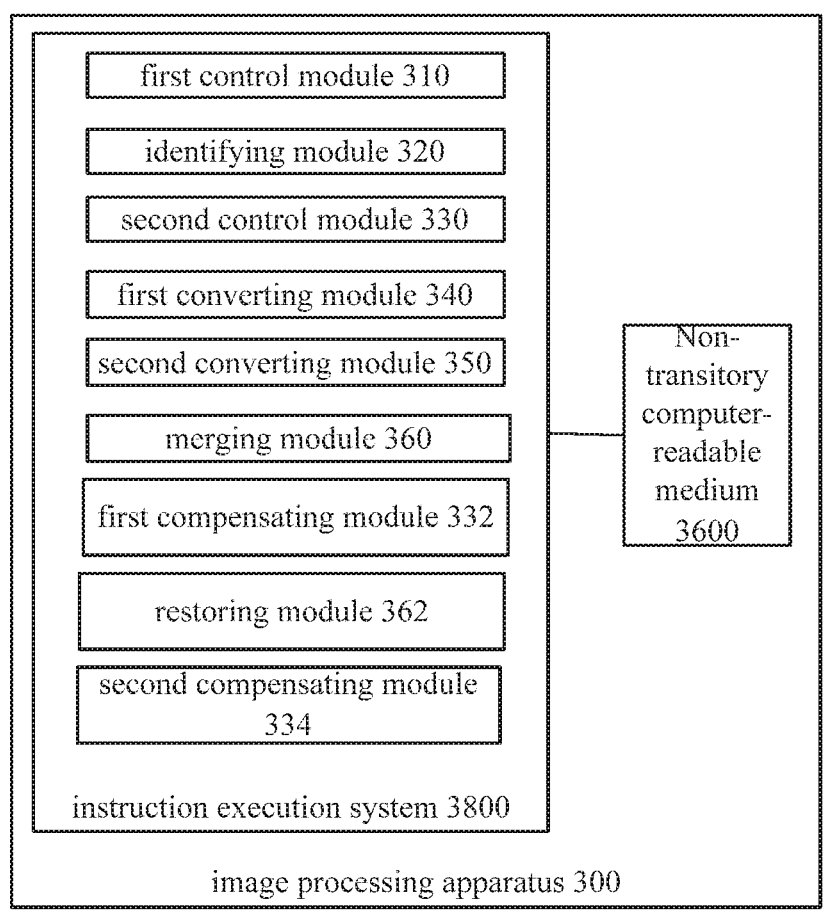
FIG. 24 is a block diagram of an image processing apparatus according to an embodiment of the present disclosure.

Referring to FIG. 24, in some implementations, the image processing apparatus 300 further includes a first compensating module 332 and a restoring module 362. The first compensating module 332 is configured to perform a white-balance compensation on the color-block image before the color-block image is converted into the simulation image. The restoring module 362 is configured to perform a reverse white-balance compensation on the simulation image.

In other words, the act at block 132 can be implemented by the third compensating unit 332, and the act at block 162 can be implemented by the third compensating unit 362.

Referring to FIG. 24 again, in some implementations, the image processing apparatus 300 further includes a second compensating module 334. The second compensating module 334 is configured to perform at least one of a bad-point compensation and a crosstalk compensation on the color-block image. In other words, the act at block 134 can be implemented by the first processing module 334.

Figure 25:
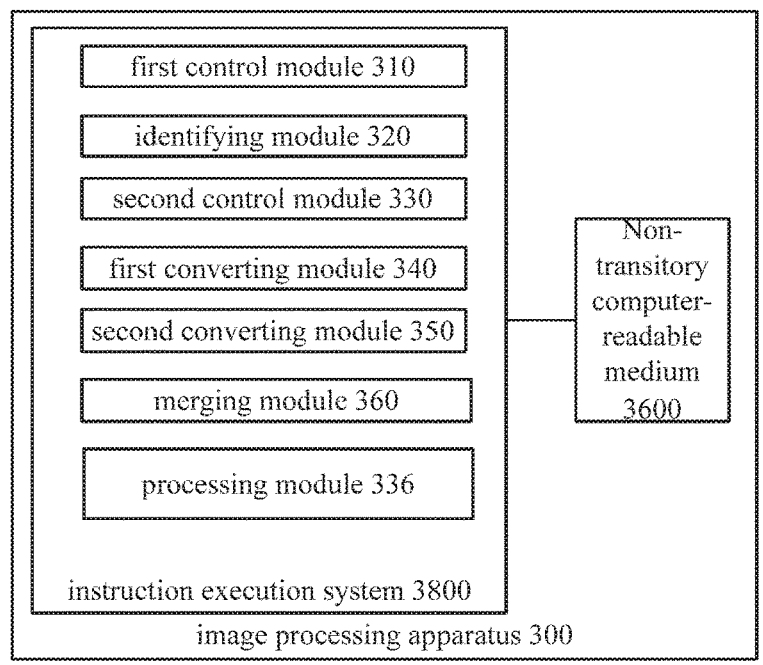
FIG. 25 is a block diagram of an image processing apparatus according to an embodiment of the present disclosure.

Referring to FIG. 25, in some implementations, the image processing apparatus 300 further includes a processing module 336. The processing module 336 is configured to perform at least one of a mirror shape correction, a demosaicking processing, a denoising processing and an edge sharpening processing on the simulation image. In other words, the act at block 136 can be implemented by the first processing module 336.

The present disclosure also provides an electronic device.

Figure 26:
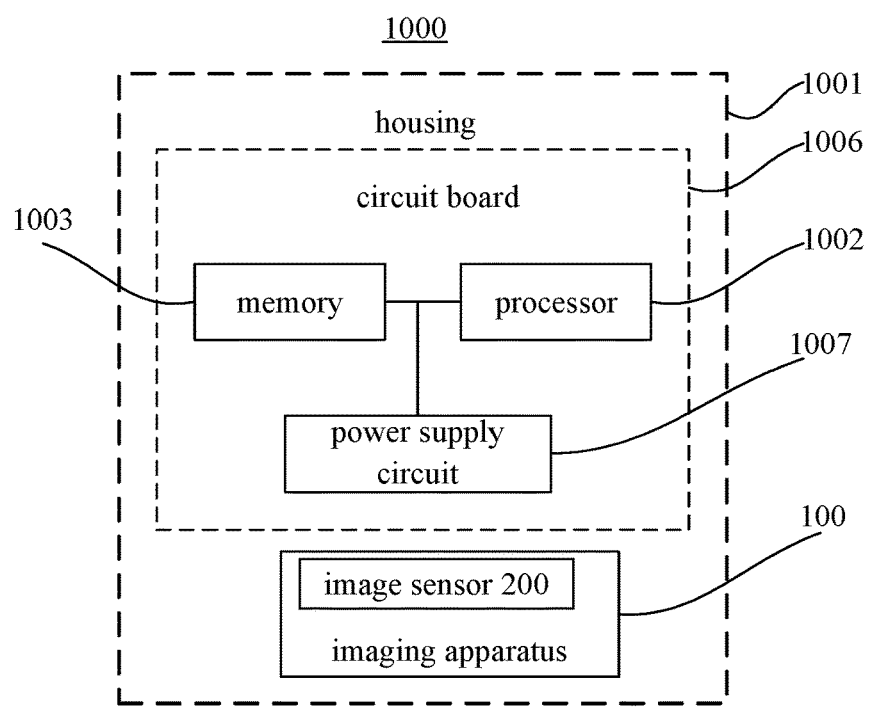
FIG. 26 is a block diagram of an electronic device 1000 according to an embodiment of the present disclosure.

FIG. 26 is a block diagram of an electronic device 1000 according to an embodiment of the present disclosure.

Referring to FIG. 26, the electronic device 1000 of the present disclosure includes a housing 1001, a processor 1002, a memory 1003, a circuit board 1006, a power supply circuit 1007, and an imaging apparatus 100. The circuit board 1006 is enclosed by the housing 1001. The processor 1002 and the memory 1003 are positioned on the circuit board 1006. The power supply circuit 1007 is configured to provide power for respective circuits or components of the electronic device 1000. The memory 1003 is configured to store executable program codes. The imaging apparatus 100 includes an image sensor 200. As illustrated above, the image sensor 200 includes an array 210 of photosensitive pixel units and an array 220 of filter units arranged on the array 210 of photosensitive pixel units. Each filter unit 220a corresponds to one photosensitive pixel unit 210a, and each photosensitive pixel unit 210a includes a plurality of photosensitive pixels 212.

The processor 1002 is configured to run a program corresponding to the executable program codes by reading the executable program codes stored in the memory, to perform following operations: controlling the image sensor to output a merged image, in which, the merged image includes an array of merged pixels, and the photosensitive pixels in a same photosensitive pixel unit are collectively output as one merged pixel; identifying a depth-of-field area based on the merged image; controlling the image sensor to output a color-block image, in which, the color-block image includes image pixel units arranged in a preset array, each image pixel unit includes a plurality of original pixels, each photosensitive pixel unit corresponds to one image pixel unit, and each photosensitive pixel corresponds to one original pixel; converting a first part of the color-block image into a first simulation image using a first interpolation algorithm, in which, the first part of the color-block image is within the depth-of-field area, the first simulation image includes first simulation pixels arranged in a preset array, and each photosensitive pixel corresponds to one first simulation pixel; converting a second part of the color-block image into a second simulation image using a second interpolation algorithm, in which, the second part of the color-block image is outside the depth-of-field area, the second simulation image includes second simulation pixels arranged in a preset array, each photosensitive pixel corresponds to one second simulation pixel, and the first interpolation algorithm is more complex than the second interpolation algorithm; and merging the first simulation image and the second simulation image to generate a simulation image corresponding to the color-block image.

In some implementations, the imaging apparatus includes a front camera or a real camera (not illustrated in FIG. 26).

In some implementations, the processor 1002 is configured to run a program corresponding to the executable program codes by reading the executable program codes stored in the memory, to identify the depth-of-field area by acts of: dividing the merged image into one or more analysis areas arranged in an array; calculating a phase difference for each analysis area; and combining the analysis areas with the phase difference satisfying a preset condition as the depth-of-field area.

In some implementations, the processor 1002 is configured to run a program corresponding to the executable program codes by reading the executable program codes stored in the memory, to perform: determining whether a color of a first simulation pixel is identical to that of an original pixel at a same position as the first simulation pixel; when the color of the first simulation pixel is identical to that of the original pixel at the same position as the first simulation pixel, determining a pixel value of the original pixel as a pixel value of the first simulation pixel; and when the color of the first simulation pixel is different from that of the original pixel at the same position as the first simulation pixel, determining the pixel value of the first simulation pixel according to a pixel value of an association pixel, in which the association pixel is selected from an image pixel unit with a same color as the first simulation pixel and adjacent to the original pixel.

In some implementations, the processor 1002 is configured to run a program corresponding to the executable program codes by reading the executable program codes stored in the memory, to perform: calculating a change of the color of the first simulation pixel in each direction of at least two directions according to the pixel value of the association pixel; calculating a weight in each direction of the at least two directions according to the change; and calculating the pixel value of the first simulation pixel according to the weight and the pixel value of the association pixel.

In some implementations, the processor 1002 is configured to run a program corresponding to the executable program codes by reading the executable program codes stored in the memory, to perform: calculating an average pixel value of each image pixel unit of the second part of the color-block image outside the depth-of-field area; determining whether a color of a second simulation pixel is identical to that of the original pixel at a same position as the second simulation pixel; when the color of the second simulation pixel is identical to that of the original pixel at the same position as the second simulation pixel, determining the average pixel value of an image pixel unit corresponding to the original pixel as a pixel value of the second simulation pixel; and when the color of the second simulation pixel is different from that of the original pixel at the same position as the second simulation pixel, determining an average pixel value of an image pixel unit with a same color as the second simulation pixel and closest to the original pixel as the pixel value of the second simulation pixel.

In some implementations, the processor 1002 is configured to run a program corresponding to the executable program codes by reading the executable program codes stored in the memory, to perform following operations: performing a white-balance compensation on the color-block image before the color-block image is converted; and performing a reverse white-balance compensation on the simulation image after the simulation image is acquired.

In some implementations, the processor 1002 is configured to run a program corresponding to the executable program codes by reading the executable program codes stored in the memory, to perform following operation: performing at least one of a bad-point compensation and a crosstalk compensation on the color-block image.

In some implementations, the processor 1002 is configured to run a program corresponding to the executable program codes by reading the executable program codes stored in the memory, to perform following operations: performing at least one of a mirror shape correction, a demosaicking processing, a denoising processing and an edge sharpening processing on the simulation image.

In some implementations, the electronic device may be a mobile phone or a tablet computer, which is not limited herein.

The electronic device 1000 may further include an inputting component (not illustrated in FIG. 26). It should be understood that, the inputting component may further include one or more of the followings: an inputting interface, a physical button of the electronic device 1000, a microphone, etc.

It should be understood that, the electronic device 1000 may further include one or more of the following components (not illustrated in FIG. 26): an audio component, an input/output (I/O) interface, a sensor component and a communication component. The audio component is configured to output and/or input audio signals, for example, the audio component includes a microphone. The I/O interface is configured to provide an interface between the processor 1002 and peripheral interface modules. The sensor component includes one or more sensors to provide status assessments of various aspects of the electronic device 1000. The communication component is configured to facilitate communication, wired or wirelessly, between the electronic device 1000 and other devices.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium.

Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An image processing method, applied in an electronic device, wherein the electronic device comprises an imaging apparatus comprising an image sensor, the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels, the image processing method comprises:

controlling the image sensor to output a merged image, wherein, the merged image comprises an array of merged pixels, and the photosensitive pixels in a same photosensitive pixel unit are collectively output as one merged pixel;

identifying a depth-of-field area based on the merged image;

controlling the image sensor to output a color-block image, wherein, the color-block image comprises image pixel units arranged in a preset array, each image pixel unit comprises a plurality of original pixels, each photosensitive pixel unit corresponds to one image pixel unit, and each photosensitive pixel corresponds to one original pixel;

converting a first part of the color-block image into a first simulation image using a first interpolation algorithm, wherein, the first part of the color-block image is within the depth-of-field area, the first simulation image comprises first simulation pixels arranged in a preset array, and each photosensitive pixel corresponds to one first simulation pixel;

converting a second part of the color-block image into a second simulation image using a second interpolation algorithm, wherein, the second part of the color-block image is outside the depth-of-field area, the second simulation image comprises second simulation pixels arranged in a preset array, each photosensitive pixel corresponds to one second simulation pixel, and the first interpolation algorithm is more complex than the second interpolation algorithm; and merging the first simulation image and the second simulation image to generate a simulation image corresponding to the color-block image.

2. The image processing method according to claim 1, wherein the preset array comprises a Bayer array.

3. The image processing method according to claim 1, wherein the image pixel unit comprises original pixels arranged in a 2-by-2 array.

4. The image processing method according to claim 1, wherein the merged image is acquired with PDAF technology, and determining a depth-of-field area based on the merged image comprises:

dividing the merged image into one or more analysis areas arranged in an array;

calculating a phase difference for each analysis area; and combining the analysis areas with the phase difference satisfying a preset condition as the depth-of-field area.

5. The image processing method according to claim 1, wherein converting a first part of the color-block image into a first simulation image using a first interpolation algorithm comprises:

determining whether a color of a first simulation pixel is identical to that of an original pixel at a same position as the first simulation pixel;

when the color of the first simulation pixel is identical to that of the original pixel at the same position as the first simulation pixel, determining a pixel value of the original pixel as a pixel value of the first simulation pixel; and when the color of the first simulation pixel is different from that of the original pixel at the same position as the first simulation pixel, determining the pixel value of the first simulation pixel according to a pixel value of an association pixel, wherein the association pixel is selected from an image pixel unit with a same color as the first simulation pixel and adjacent to the original pixel.

6. The image processing method according to claim 5, wherein determining the pixel value of the first simulation pixel according to a pixel value of an association pixel comprises:

calculating a change of the color of the first simulation pixel in each direction of at least two directions according to the pixel value of the association pixel;

calculating a weight in each direction of the at least two directions according to the change; and calculating the pixel value of the first simulation pixel according to the weight and the pixel value of the association pixel.

7. The method according to claim 1, wherein converting a second part of the color-block image into a second simulation image using a second interpolation algorithm comprises:

calculating an average pixel value of each image pixel unit of the second part of the color-block image;

determining whether a color of a second simulation pixel is identical to that of an original pixel at a same position as the second simulation pixel;

when the color of the second simulation pixel is identical to that of the original pixel at the same position as the second simulation pixel, determining the average pixel value of an image pixel unit corresponding to the original pixel as a pixel value of the second simulation pixel; and when the color of the second simulation pixel is different from that of the original pixel at the same position as the second simulation pixel, determining an average pixel value of an image pixel unit with a same color as the second simulation pixel and closest to the original pixel as the pixel value of the second simulation pixel.

8. The image processing method according to claim 1, further comprising:

performing a white-balance compensation on the color-block image; and performing a reverse white-balance compensation on the simulation image.

9. The image processing method according to claim 1, further comprising:

performing at least one of a bad-point compensation and a crosstalk compensation on the color-block image.

10. The image processing method according to claim 1, further comprising:

performing at least one of a mirror shape correction, a demosaicking processing, a denoising processing and an edge sharpening processing on the simulation image.

11. An image processing apparatus, applied in an electronic device, wherein the electronic device comprises an imaging apparatus comprising an image sensor, the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels; the image processing apparatus comprises a non-transitory computer-readable medium comprising computer-executable instructions stored thereon, and an instruction execution system which is configured by the instructions to implement at least one of:

a first control module, configured to control the image sensor to output a merged image, wherein, the merged image comprises an array of merged pixels, and the photosensitive pixels in a same photosensitive pixel unit are collectively output as one merged pixel;

an identifying module, configured to identify a depth-of-field area based on the merged image;
a second control module, configured to control the image sensor to output a color-block image, wherein, the color-block image comprises image pixel units arranged in a preset array, each image pixel unit comprises a plurality of original pixels, each photosensitive pixel unit corresponds to one image pixel unit, and each photosensitive pixel corresponds to one original pixel;
a first converting module, configured to convert a first part of the color-block image into a first simulation image using a first interpolation algorithm, wherein, the first part of color-block image is the within the depth-of-field area, the first simulation image comprises first simulation pixels arranged in a preset array and each photosensitive pixel corresponds to one first simulation pixel;
a second converting module, configured to convert a second part of the color-block image into a second simulation image using a second interpolation algorithm, wherein, the second part of the color-block image is outside the depth-of-field area, the second simulation image comprises second simulation pixels arranged in a preset array, each photosensitive pixel corresponds to one second simulation pixel, and the first interpolation algorithm is more complex than the second interpolation algorithm; and
a merging module, configured to merge the first simulation image and the second simulation image to generate a simulation image corresponding to the color-block image.

12. The image processing apparatus according to claim 11, wherein the preset array comprises a Bayer array.

13. The image processing apparatus according to claim 11, wherein the image pixel unit comprises original pixels arranged in a 2-by-2 array.

14. The image processing apparatus according to claim 11, wherein the merged image is acquired with PDAF technology, and the identifying module comprises:
a dividing unit, configured to divide the merged image into one or more analysis areas arranged in an array;
a first calculating unit, configured to calculate a phase difference for each analysis area; and
a combining unit, configured to combine the analysis areas with the phase difference satisfying a preset condition as the depth-of-field area.

15. The image processing apparatus according to claim 11, wherein the first converting module comprises:
a first determining unit, configured to determine whether a color of a first simulation pixel is identical to that of an original pixel at a same position as the first simulation pixel;
a first processing unit, configured to determine a pixel value of the original pixel as a pixel value of the first simulation pixel, when the color of the first simulation pixel is identical to that of the original pixel at the same position as the first simulation pixel; and
a second processing unit, configured to determine the pixel value of the first simulation pixel according to a pixel value of an association pixel when the color of the first simulation pixel is different from that of the original pixel at the same position as the first simulation pixel, wherein the association pixel is selected from an image pixel unit with a same color as the first simulation pixel and adjacent to the original pixel.

16. The image processing apparatus according to claim 15, wherein the second processing unit comprises:

a first calculating sub-unit, configured to calculate a change of the color of the first simulation pixel in each direction of at least two directions according to the pixel value of the association pixel;
a second calculating sub-unit, configured to calculate a weight in each direction of the at least two directions according to the change; and
a third calculating sub-unit, configured to calculate the pixel value of the first simulation pixel according to the weight and the pixel value of the association pixel.

17. The image processing apparatus according to claim 11, wherein the second converting module comprise:
a second calculating unit, configured to calculate an average pixel value of each image pixel unit of the second part of the color-block image;
a second determining unit, configured to determine whether a color of a second simulation pixel is identical to that of an original pixel at a same position as the second simulation pixel;
a third processing unit, configured to determine the average pixel value of an image pixel unit corresponding to the original pixel as a pixel value of the second simulation pixel, when the color of the second simulation pixel is identical to that of the original pixel at the same position as the second simulation pixel; and
a fourth processing unit, configured to determine an average pixel value of an image pixel unit with a same color as the second simulation pixel and closest to the original pixel as the pixel value of the second simulation pixel, when the color of the second simulation pixel is different from that of the original pixel at the same position as the second simulation pixel.

18. The image processing apparatus according to claim 11, further comprising:
a first compensating module, configured to perform a white-balance compensation on the color-block image; and
a restoring module, configured to perform a reverse white-balance compensation on the simulation image.

19. The image processing apparatus according to claim 11, further comprising:
a second compensating module, configured to perform at least one of a bad-point compensation and a crosstalk compensation on the color-block image.

20. The image processing apparatus according to claim 11, further comprising:
a processing module, configured to perform at least one of a mirror shape correction, a demosaicking processing, a denoising processing and an edge sharpening processing on the simulation image.

21. An electronic device, comprising a housing, a processor, a memory, a circuit board, a power supply circuit, and an imaging apparatus, wherein
the circuit board is enclosed by the housing;
the processor and the memory are positioned on the circuit board;
the power supply circuit is configured to provide power for respective circuits or components of the electronic device;
the imaging apparatus comprises an image sensor, wherein the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels;

the memory is configured to store executable program codes; and the processor is configured to run a program corresponding to the executable program codes by reading the executable program codes stored in the memory, to perform following operations:

controlling the image sensor to output a merged image, wherein, the merged image comprises an array of merged pixels, and the photosensitive pixels in a same photosensitive pixel unit are collectively output as one merged pixel;

identifying a depth-of-field area based on the merged image;

controlling the image sensor to output a color-block image, wherein, the color-block image comprises image pixel units arranged in a preset array, each image pixel unit comprises a plurality of original pixels, each photosensitive pixel unit corresponds to one image pixel unit, and each photosensitive pixel corresponds to one original pixel;

converting a first part of the color-block image into a first simulation image using a first interpolation algorithm, wherein, the first part of the color-block image is within the depth-of-field area, the first simulation image comprises first simulation pixels arranged in a preset array, and each photosensitive pixel corresponds to one first simulation pixel;

converting a second part of the color-block image into a second simulation image using a second interpolation algorithm, wherein, the second part of the color-block image is outside the depth-of-field area, the second simulation image comprises second simulation pixels arranged in a preset array, each photosensitive pixel corresponds to one second simulation pixel, and the first interpolation algorithm is more complex than the second interpolation algorithm; and merging the first simulation image and the second simulation image to generate a simulation image corresponding to the color-block image.

22. The electronic device according to claim 21, wherein the imaging apparatus comprises a front camera or a rear camera.

* * * * *